US010728897B2

(12) United States Patent
Nagaraja et al.

(10) Patent No.: US 10,728,897 B2
(45) Date of Patent: *Jul. 28, 2020

(54) UPLINK RESOURCES FOR BEAM RECOVERY

(71) Applicant: QUALCOMM Incorporated, San Diego, CA (US)

(72) Inventors: Sumeeth Nagaraja, San Diego, CA (US); Tao Luo, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,265

(22) Filed: Dec. 14, 2018

(65) Prior Publication Data
US 2019/0124640 A1 Apr. 25, 2019

Related U.S. Application Data

(63) Continuation of application No. 15/892,292, filed on Feb. 8, 2018, now Pat. No. 10,194,442.
(Continued)

(51) Int. Cl.
H04W 72/04 (2009.01)
H04B 7/06 (2006.01)
(Continued)

(52) U.S. Cl.
CPC ........ *H04W 72/046* (2013.01); *H04B 7/0695* (2013.01); *H04B 17/318* (2015.01);
(Continued)

(58) Field of Classification Search
CPC ............... H04W 72/04; H04W 72/046; H04W 36/0055; H04B 17/318; H04B 7/06; H04B 7/0695
See application file for complete search history.

(56) References Cited

U.S. PATENT DOCUMENTS

2006/0098580 A1 5/2006 Li et al.
2012/0051270 A1* 3/2012 Chen .................. H04B 7/155
370/279
(Continued)

FOREIGN PATENT DOCUMENTS

WO WO-2016164060 A1 10/2016
WO WO-2017022902 A1 2/2017
(Continued)

OTHER PUBLICATIONS

Nokia: "On Beam Management in NR—Procedures", 3GPP TSG-RAN WG1 #86 Bis, R1-1610239, Lisbon, Portugal, Oct. 10-14, 2016, pp. 1-4.
(Continued)

Primary Examiner — Kyaw Z Soe
(74) Attorney, Agent, or Firm — Holland & Hart LLP

(57) ABSTRACT

Methods, systems, and devices for wireless communication are described. Uplink resources may be allocated for transmissions of beam recovery messages. For example, a user equipment (UE) communicating in a system that supports beamformed transmissions may receive a configuration for resources from a base station, where the resources may be used for beam recovery signaling. The UE may identify a beam failure on one or more active beams used to communicate with the base station, and the UE may transmit a beam recovery message to the base station. In such cases, the beam recovery message may be transmitted according to the configuration received from the base station such that the beam recovery message is transmitted using the beam recovery resources. In some cases, the configuration may be received at the UE via radio resource control (RRC) signaling or via a system information broadcast from the base station.

41 Claims, 18 Drawing Sheets

Related U.S. Application Data

(60) Provisional application No. 62/457,704, filed on Feb. 10, 2017.

(51) Int. Cl.
  *H04B 17/318* (2015.01)
  *H04W 36/00* (2009.01)
  *H04B 17/309* (2015.01)
  *H04W 72/12* (2009.01)
  *H04B 7/08* (2006.01)

(52) U.S. Cl.
  CPC ......... *H04W 36/0055* (2013.01); *H04B 7/088* (2013.01); *H04B 17/309* (2015.01); *H04W 72/1284* (2013.01)

(56) References Cited

U.S. PATENT DOCUMENTS

| | | | |
|---|---|---|---|
| 2013/0163530 A1* | 6/2013 | Chen | H04W 72/04 370/329 |
| 2013/0215947 A1 | 8/2013 | Yao et al. | |
| 2013/0294264 A1* | 11/2013 | Nagaraja | H04W 72/0453 370/252 |
| 2014/0010178 A1 | 1/2014 | Yu et al. | |
| 2014/0219243 A1* | 8/2014 | Meshkati | H04W 52/243 370/331 |
| 2017/0155432 A1 | 6/2017 | Kim et al. | |
| 2018/0034524 A1 | 2/2018 | Pao et al. | |
| 2018/0042000 A1 | 2/2018 | Zhang et al. | |
| 2018/0083680 A1 | 3/2018 | Guo et al. | |
| 2018/0234960 A1 | 8/2018 | Nagaraja et al. | |

FOREIGN PATENT DOCUMENTS

| | | |
|---|---|---|
| WO | WO-2017024516 A1 | 2/2017 |
| WO | WO-2017221202 A1 | 12/2017 |

OTHER PUBLICATIONS

International Search Report and Written Opinion—PCT/US2018/017635—ISA/EPO—dated May 17, 2018.

Samsung: "Trigger Condition for Beam Failure Recovery", 3GPP Draft; R1-1702939 Trigger Condition for Beam Failure Recovery, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 13, 2017-Feb. 17, 2017, Feb. 7, 2017 (Feb. 7, 2017), 4 Pages, XP051221748, Retrieved from the Internet: URL: http://www.3gpp.org/ftp/tsg_ran/WG1_RL1/TSGR1_88/Docs/ [retrieved on Feb. 7, 2017].

ZTE, et al., "On CSI-RS for Beam Management", 3GPP Draft; R1-1701813 on CSI-RS for Beam Management, 3rd Generation Partnership Project (3GPP), Mobile Competence Centre; 650, Route Des Lucioles; F-06921 Sophia-Antipolis Cedex; France, vol. RAN WG 1, no. Athens, Greece; Feb. 13, 2017-Feb. 17, 2017, Feb. 7, 2017 (Feb. 7, 2017), 7 Pages, XP051220879, Retrieved from the Internet: URL: http://www.3gpp.org/ftp/tsg_ran/WG1_RL1/TSGR1_88/Docs/ [retrieved on Feb. 7, 2017].

\* cited by examiner

UPLINK RESOURCES FOR BEAM RECOVERY

CROSS REFERENCES

The present Application for Patent is a Continuation of U.S. patent application Ser. No. 15/892,292 by Nagaraja et al., entitled "Uplink Resources For Beam Recovery" filed Feb. 8, 2018, which claims priority to U.S. Provisional Patent Application No. 62/457,704 by Nagaraja et al., entitled "Uplink Resources For Beam Recovery," filed Feb. 10, 2017, assigned to the assignee hereof, and is hereby expressly incorporated by reference herein in its entirety.

BACKGROUND

The following relates generally to wireless communication, and more specifically to uplink resources for beam recovery.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems (e.g., NR systems) may operate in frequency ranges that are associated with beamformed transmissions between wireless devices. For example, transmissions in millimeter wave (mmW) frequency ranges and may be associated with increased signal attenuation (e.g., path loss) as compared to transmissions in non-mmW frequency ranges. As a result, signal processing techniques such as beamforming may be used to combine energy coherently and overcome the path losses in these systems. In some cases, one or more active beams between two wireless devices may become misaligned. Upon detecting such a misalignment (or beam failure), a UE may attempt to access uplink resources to reconnect with the serving cell, but some uplink resources used to convey the attempted beam recovery may be associated with limited throughput or high latency, or both. Thus, improved techniques for uplink resource allocation for beam recovery may be desired.

SUMMARY

The described techniques relate to improved methods, systems, devices, or apparatuses that support uplink resources for beam recovery. Generally, the described techniques provide for configuration of dedicated resources for one or more UEs to convey a beam recovery request to a base station. In some cases, these resources may be dynamically or semi-statically configured by the base station and communicated to one or more UEs. Using techniques described herein, a UE may determine a beam failure on one or more active beams (e.g., due to misalignment) and use the configured resources to send the beam recovery message. In some aspects, one or more downlink beams (e.g., each of which may have an associated reference signal) may be associated with equivalent uplink resources over which the UE may convey the beam recovery message. In some examples, the beam recovery message may contain measurements or other information which may assist the base station in reconnecting with the UE.

A method of wireless communication is described. The method may include receiving a configuration for beam recovery resources, identifying a beam failure of one or more active beams used to communicate with a base station, and transmitting, according to the received configuration, a beam recovery message to the base station using the beam recovery resources based at least in part on the identified beam failure.

An apparatus for wireless communication is described. The apparatus may include means for receiving a configuration for beam recovery resources, means for identifying a beam failure of one or more active beams used to communicate with a base station, and means for transmitting, according to the received configuration, a beam recovery message to the base station using the beam recovery resources based at least in part on the identified beam failure.

Another apparatus for wireless communication is described. The apparatus may include a processor, memory in electronic communication with the processor, and instructions stored in the memory. The instructions may be operable to cause the processor to receive a configuration for beam recovery resources, identify a beam failure of one or more active beams used to communicate with a base station, and transmit, according to the received configuration, a beam recovery message to the base station using the beam recovery resources based at least in part on the identified beam failure.

A non-transitory computer readable medium for wireless communication is described. The non-transitory computer-readable medium may include instructions operable to cause a processor to receive a configuration for beam recovery resources, identify a beam failure of one or more active beams used to communicate with a base station, and transmit, according to the received configuration, a beam recovery message to the base station using the beam recovery resources based at least in part on the identified beam failure.

Some examples of the method, apparatus, and non-transitory computer-readable medium described above may further include processes, features, means, or instructions for receiving a message from the base station in response to the transmitted beam recovery message, the message comprising an indication of a set of reference signals for beam refinement. In some examples of the method, apparatus, and non-transitory computer-readable medium described above, transmitting the beam recovery message to the base station comprises: transmitting the beam recovery message on one or more resources in one or more beam directions.

In some examples of the method, apparatus, and non-transitory computer-readable medium described above, receiving the configuration for the beam recovery resources comprises: receiving the configuration as part of radio resource control (RRC) signaling from the base station or as part of a system information broadcast from the base station. Some examples of the method, apparatus, and non-transitory computer-readable medium described above may further include processes, features, means, or instructions for receiving an indication that enables the use of the beam recovery resources for the transmission of the beam recovery message, wherein transmitting the beam recovery message may be based at least in part on the indication.

Some examples of the method, apparatus, and non-transitory computer-readable medium described above may further include processes, features, means, or instructions for receiving an indication that disables the use of the beam recovery resources for the transmission of the beam recovery message, wherein transmitting the beam recovery message may be based at least in part on the indication. In some examples of the method, apparatus, and non-transitory computer-readable medium described above, the configuration comprises a UE-specific configuration for the beam recovery resources. In some examples of the method, apparatus, and non-transitory computer-readable medium described above, the configuration comprises an indication of a plurality of beams for transmitting the beam recovery message, the indication based at least in part on a signal-to-noise ratio (SNR) associated with the UE, and wherein transmitting the beam recovery message comprises: transmitting the beam recovery message using at least one of the plurality of beams.

In some examples of the method, apparatus, and non-transitory computer-readable medium described above, the configuration comprises an indication of a system frame number (SFN) corresponding to the beam recovery resources, a subframe index (SFI) corresponding to the beam recovery resources, a periodicity corresponding to the beam recovery resources, one or more resource elements (REs) corresponding to the beam recovery resources, or a combination thereof.

In some examples of the method, apparatus, and non-transitory computer-readable medium described above, the beam recovery resources occupy a first region of resources that may be different from a second region of resources allocated for transmission of a random access message. In some examples of the method, apparatus, and non-transitory computer-readable medium described above, the configuration comprises an indication of a mapping between a downlink beam from the base station and the beam recovery resources.

Some examples of the method, apparatus, and non-transitory computer-readable medium described above may further include processes, features, means, or instructions for transmitting, according to the received configuration, a scheduling request (SR) to the base station using the beam recovery resources. Some examples of the method, apparatus, and non-transitory computer-readable medium described above may further include processes, features, means, or instructions for performing measurements of a set of reference signals, the set of reference signals associated with the one or more active beams, wherein the beam recovery message comprises a measurement report based at least in part on the performed measurements.

In some examples of the method, apparatus, and non-transitory computer-readable medium described above, the measurement report comprises a reference signal received power (RSRP), a reference signal received quality (RSRQ), a channel quality indicator (CQI), a precoding matrix indicator (PMI) a rank, or a combination thereof. In some examples of the method, apparatus, and non-transitory computer-readable medium described above, the set of reference signals comprises a synchronization signal, a mobility reference signal, a channel state information reference signal (CSI-RS), or a combination thereof.

Some examples of the method, apparatus, and non-transitory computer-readable medium described above may further include processes, features, means, or instructions for determining a mobility condition associated with the UE, the mobility condition of the UE comprising a direction of the UE relative to the base station, an orientation of the UE, a distance from the base station, or a combination thereof, wherein the beam recovery message comprises an indication of the mobility condition. Some examples of the method, apparatus, and non-transitory computer-readable medium described above may further include processes, features, means, or instructions for identifying antenna array information corresponding to one or more antenna arrays located at the UE, wherein the beam recovery message comprises an indication of the antenna array information.

In some examples of the method, apparatus, and non-transitory computer-readable medium described above, the antenna array information comprises a number of antenna arrays located at the UE. Some examples of the method, apparatus, and non-transitory computer-readable medium described above may further include processes, features, means, or instructions for determining an identity of a downlink beam from the base station, wherein the beam recovery message comprises an indication of the identity of the downlink beam.

A method of wireless communication is described. The method may include communicating with one or more UEs using one or more active beams, transmitting a configuration for beam recovery resources, and receiving one or more beam recovery messages on the beam recovery resources, the one or more beam recovery messages indicating a beam failure of at least one of the one or more active beams.

An apparatus for wireless communication is described. The apparatus may include means for communicating with one or more UEs using one or more active beams, means for transmitting a configuration for beam recovery resources, and means for receiving one or more beam recovery messages on the beam recovery resources, the one or more beam recovery messages indicating a beam failure of at least one of the one or more active beams.

Another apparatus for wireless communication is described. The apparatus may include a processor, memory in electronic communication with the processor, and instructions stored in the memory. The instructions may be operable to cause the processor to communicate with one or more UEs using one or more active beams, transmit a configuration for beam recovery resources, and receive one or more beam recovery messages on the beam recovery resources, the one or more beam recovery messages indicating a beam failure of at least one of the one or more active beams.

A non-transitory computer readable medium for wireless communication is described. The non-transitory computer-readable medium may include instructions operable to cause a processor to communicate with one or more UEs using one or more active beams, transmit a configuration for beam recovery resources, and receive one or more beam recovery messages on the beam recovery resources, the one or more beam recovery messages indicating a beam failure of at least one of the one or more active beams.

Some examples of the method, apparatus, and non-transitory computer-readable medium described above may further include processes, features, means, or instructions for transmitting a message to a UE in response to the received one or more beam recovery messages, the message comprising an indication of a set of reference signals for beam refinement. Some examples of the method, apparatus, and non-transitory computer-readable medium described above may further include processes, features, means, or instructions for receiving the one or more beam recovery messages comprises receiving a measurement report from the UE.

Some examples of the method, apparatus, and non-transitory computer-readable medium described above may further include processes, features, means, or instructions for determining a transmit beam direction based at least in part on the measurement report. Some examples of the method, apparatus, and non-transitory computer-readable medium described above may further include processes, features, means, or instructions for transmitting the message to the UE using the determined transmit beam direction.

Some examples of the method, apparatus, and non-transitory computer-readable medium described above may further include processes, features, means, or instructions for performing a measurement on uplink signals over the one or more active beams. Some examples of the method, apparatus, and non-transitory computer-readable medium described above may further include processes, features, means, or instructions for determining a transmit beam direction based at least in part on the measurement of the uplink signals, wherein transmitting the message to the UE may be based at least in part on the transmit beam direction. In some examples of the method, apparatus, and non-transitory computer-readable medium described above, receiving the one or more beam recovery messages comprises: receiving the one or more beam recovery messages on a set of resources in one or more receive beam directions.

In some examples of the method, apparatus, and non-transitory computer-readable medium described above, transmitting the configuration for the beam recovery resources comprises: transmitting the configuration as part of RRC signaling or as part of a system information broadcast. Some examples of the method, apparatus, and non-transitory computer-readable medium described above may further include processes, features, means, or instructions for transmitting an indication that enables the use of the beam recovery resources for the one or more beam recovery messages, wherein receiving the one or more beam recovery messages may be based at least in part on the indication.

Some examples of the method, apparatus, and non-transitory computer-readable medium described above may further include processes, features, means, or instructions for transmitting an indication that disables the use of the beam recovery resources for the one or more beam recovery messages, wherein receiving the one or more beam recovery messages may be based at least in part on the indication. In some examples of the method, apparatus, and non-transitory computer-readable medium described above, identifying a traffic level associated with a subset of the one or more UEs, wherein transmitting the configuration for the beam recovery resources comprises: transmitting the configuration to the subset of the one or more UEs based at least in part on the identified traffic level.

Some examples of the method, apparatus, and non-transitory computer-readable medium described above may further include processes, features, means, or instructions for identifying an SNR associated with a UE, wherein the configuration comprises a UE-specific configuration of beam recovery resources based at least in part on the identified SNR. In some examples of the method, apparatus, and non-transitory computer-readable medium described above, the configuration comprises an indication of a plurality of beams for each of the one or more beam recovery messages.

Some examples of the method, apparatus, and non-transitory computer-readable medium described above may further include processes, features, means, or instructions for identifying a payload associated with an uplink transmission from the one or more UEs, wherein the configuration comprises an indication of additional beam recovery resources allocated for the one or more beam recovery messages based at least in part on the identified payload. In some examples of the method, apparatus, and non-transitory computer-readable medium described above, the beam recovery resources may be associated with a first region of resources that may be different from a second region resources allocated for transmission of a random access message.

Some examples of the method, apparatus, and non-transitory computer-readable medium described above may further include processes, features, means, or instructions for identifying one or more reference signals associated with a set of downlink beams. Some examples of the method, apparatus, and non-transitory computer-readable medium described above may further include processes, features, means, or instructions for identifying a mapping between the beam recovery resources and the set of downlink beams based at least in part on the one or more reference signals, wherein the configuration comprises an indication of the mapping.

DETAILED DESCRIPTION

Figure 1:
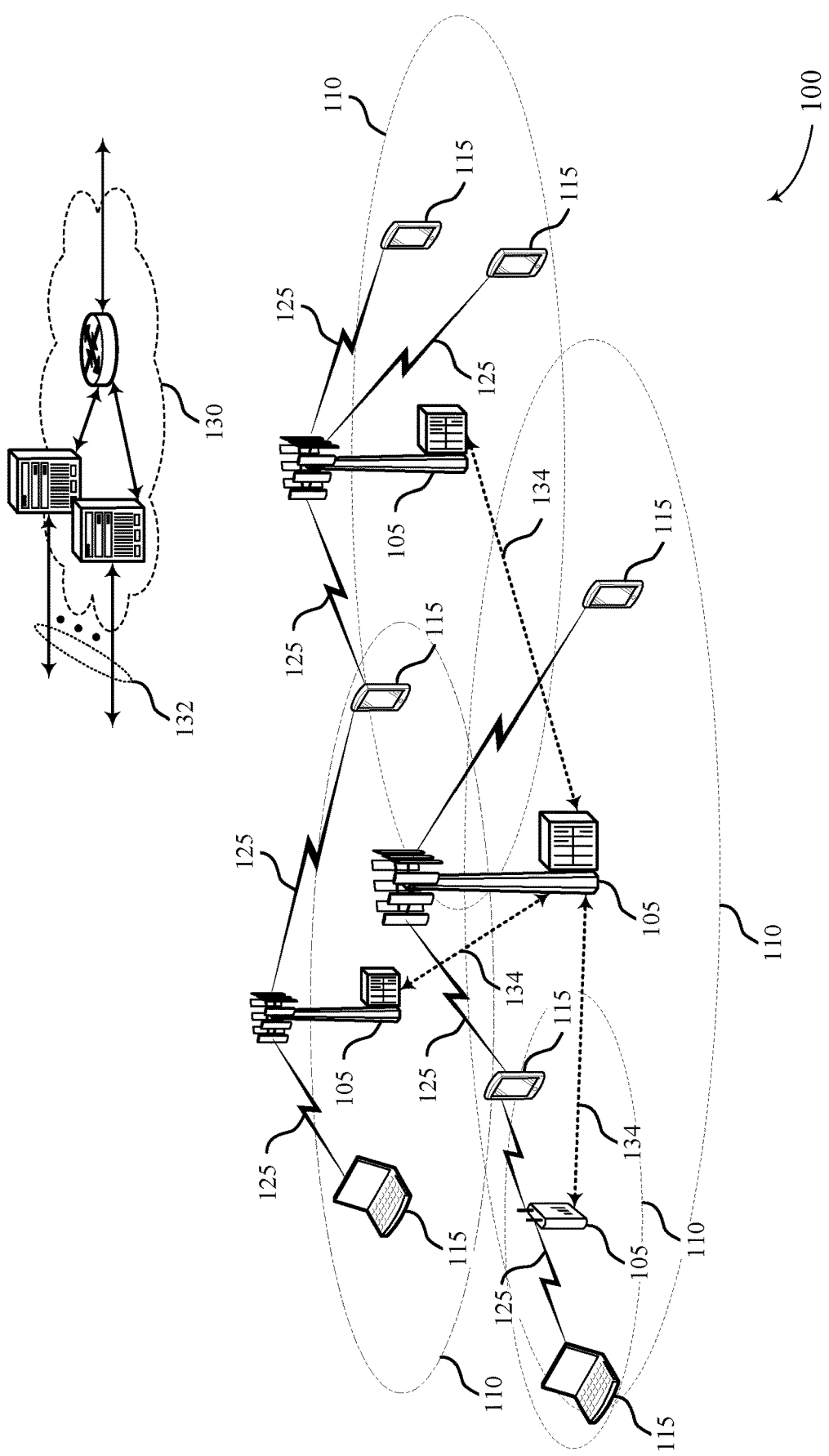
FIG. 1 illustrates an example of a system for wireless communication that supports uplink resources for beam recovery in accordance with aspects of the present disclosure.

Some wireless communication systems may operate in frequency ranges that support beamformed transmissions between wireless devices. For example, communications in mmW frequency bands may experience increased signal attenuation (e.g., path loss). As a result, signal processing techniques such as beamforming may be used to combine energy coherently and overcome the path losses in these systems. In such systems, wireless devices, such as a UE and base station, may be able to communicate over one or more active beams, which may correspond to a transmit beam used at the transmitting device and a receive beam at a receiving device (e.g., comprising a beam pair). In some cases, the active beam pair(s) may become misaligned (e.g., due to beam switch failure or signal blockage) such that the UE and base station may not be able to communicate over the obstructed active beam pair(s) due to the beam failure. A UE may accordingly detect the beam failure (e.g., by monitoring a subset of reference signals) on the active beams used to communicate with the base station.

To reconnect with the serving cell, the UE may need resources, which may be defined in terms of time, frequency, and/or a beam, to transmit a beam recovery request (e.g., a beam failure recovery request). In a system supporting multi-beam operation, certain uplink resources may be used by the UE to reconnect with the cell. For example, a UE may default to using SR resources or random access channel (RACH) resources to convey such a beam recovery request. But these resources may be associated with limited throughput and/or high latency (e.g., because they may be contention-based resources or may be available with a relatively low periodicity). Accordingly, some systems may support the configuration of one or more sets of dedicated resources for a UE (or multiple UEs) to use to transmit beam recovery requests, which may enable faster, more robust, and more efficient recovery.

The techniques described herein generally provide for the allocation of dedicated resources for the transmission of a beam recovery message. For example, a UE communicating in a system that supports beamformed transmissions may receive a configuration for uplink resources from a base station, where the uplink resources may be dedicated for beam recovery signaling. The UE may identify a beam failure (e.g., due to path loss or interference) on one or more active beams used to communicate with the base station, and the UE may transmit a beam recovery message to the base station. In such cases, the beam recovery message may be transmitted according to the configuration received from the base station such that the beam recovery message is transmitted using the dedicated beam recovery resources. In some cases, the configuration may be received at the UE via RRC signaling or via a system information broadcast from the base station. Additionally, the use of the beam recovery resources may be enabled or disabled by an indication from the base station (e.g., using lower layer signaling), where the UE may transmit the beam recovery message on different sets of resources based on whether the beam recovery resources are enabled or disabled. Following the transmission of the beam recovery request message, the UE may monitor for a response to the beam recovery request message from the base station.

Aspects of the disclosure are initially described in the context of a wireless communications system. Further examples are then provided of an uplink resource grid and a process flow for the transmission of a beam recovery message. Aspects of the disclosure are further illustrated by and described with reference to apparatus diagrams, system diagrams, and flowcharts that relate to uplink resources for beam recovery.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices. Wireless communications system 100 may support the efficient use of uplink resources for beam recovery.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases, wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may thus support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays (e.g., panels), which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a network device, or core network 130 supporting radio bearers for user plane data. At the physical (PHY) layer, transport channels may be mapped to physical channels.

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In wireless communications system 100, resources (e.g., uplink resources) may be allocated for the transmission of beam recovery messages. For example, a UE 115 communicating in wireless communications system 100 may receive a configuration for resources from a base station 105, where the resources may be dedicated for beam recovery signaling. The UE 115 may identify a beam failure (e.g., due to path loss or interference) on one or more active beams used to communicate with the base station 105, and the UE 115 may transmit a beam recovery message to the base station 105. In such cases, the beam recovery message may be transmitted according to the configuration received from the base station 105 such that the beam recovery message is transmitted using the dedicated beam recovery resources. In some cases, the configuration may be received at the UE 115 via RRC signaling or via a system information broadcast from the base station 105. Additionally, the use of the beam recovery resources may be enabled or disabled by an indication from the base station 105 (e.g., using layer 1 (L1) (i.e., PHY layer) signaling or layer 2 (L2) signaling), where the UE 115 may transmit the beam recovery message on different sets of resources based on whether the beam recovery resources are enabled or disabled.

Figure 2:
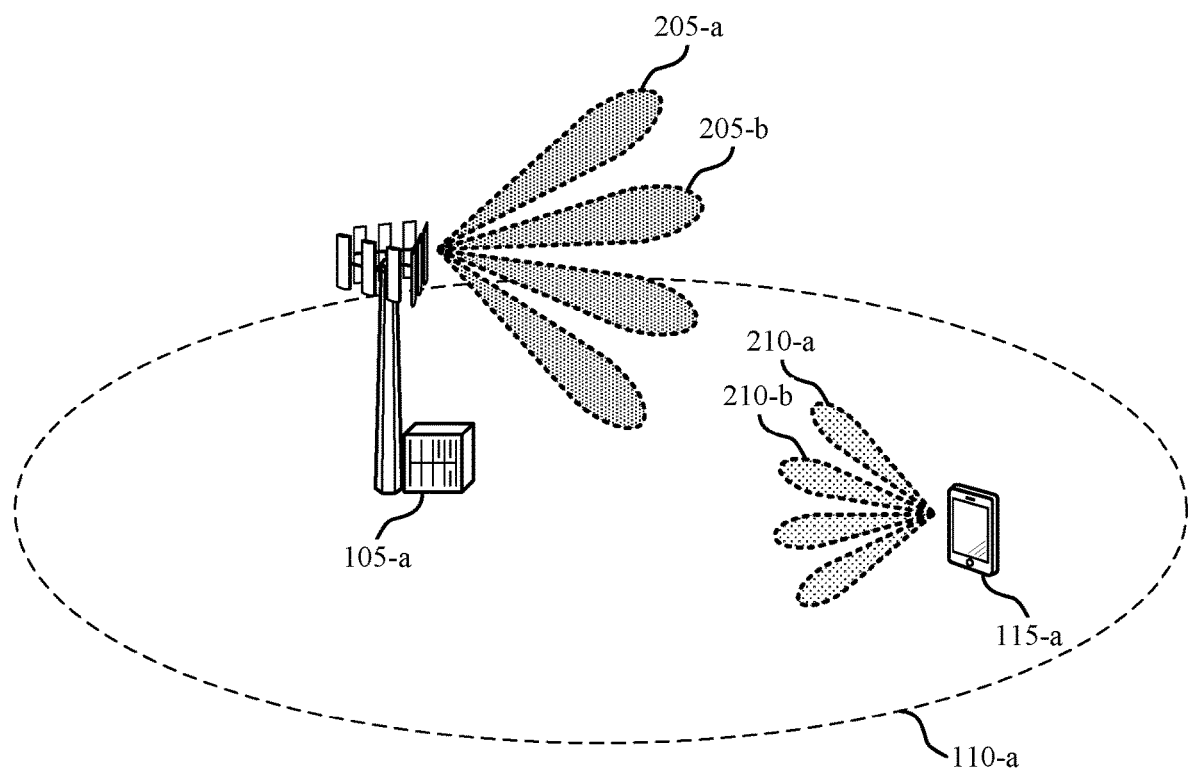
FIG. 2 illustrates an example of a system for wireless communication that supports uplink resources for beam recovery in accordance with aspects of the present disclosure.

FIG. 2 illustrates an example of a wireless communications system 200 that supports uplink resources for beam recovery in accordance with various aspects of the present disclosure. Wireless communications system 200 includes a base station 105-a and a UE 115-a, each of which may be an example of the corresponding devices as described with reference to FIG. 1. Wireless communications system 200 may support the use of dedicated resources (e.g., time, frequency, and/or spatial resources) for the transmission of a beam recovery message.

Wireless communications system 200 may operate in frequency ranges that are associated with beamformed transmissions between base station 105-a and UE 115-a. For example, wireless communications system 200 may operate using mmW frequency ranges. As a result, signal processing techniques, such as beamforming, may be used to coherently combine energy and overcome path losses. By way of example, base station 105-a may contain multiple antennas. Each antenna may transmit (or receive) a phase-shifted version of a signal such that the phase-shifted versions constructively interfere in certain regions and destructively interfere in others. Weights may be applied to the various phase-shifted versions of the signal, e.g., to steer the transmissions in a desired direction. Such techniques (or similar techniques) may serve to increase the coverage area 110-a of the base station 105-a or otherwise benefit wireless communications system 200.

Transmit beams 205-a and 205-b represent examples of beams over which data (e.g., or control information) may be transmitted. Accordingly, each transmit beam 205 may be directed from base station 105-a toward a different region of the coverage area 110-a, and in some cases, two or more beams may overlap. Transmit beams 205-a and 205-b may be transmitted simultaneously or at different times. In either case, a UE 115-a may be capable of receiving the information sent using one or more transmit beams 205 via respective receive beams 210.

In one example, UE 115-a may include multiple antennas and form one or more receive beams 210 (e.g., receive beams 210-a and 210-b). The receive beams 210-a, 210-b may each receive one of the transmit beams 205-a and 205-b (e.g., UE 115-a may be positioned within wireless communications system 200 such that UE 115-a receives both beamformed transmit beams 205). Such a scheme may be referred to as a receive-diversity scheme. In some cases, the receive beams 210 may each receive a single transmit beam 205 (e.g., receive beam 210-a may receive the transmit beam 205-a with various path loss and multipath effects included). That is, each antenna of UE 115-a may receive the transmit beam 205-a which has experienced different path losses or phase shifts (e.g., different phase shifts may be due to the different path lengths between the base station 105-a and the respective antennas of the UE 115-a) and appropriately combine the received signals in one or more receive beams 210. In other examples, a single receive beam 210 may receive multiple transmit beams 205.

A transmit beam 205 and a corresponding receive beam 210 may be referred to as a beam pair. The beam pair may be established during cell acquisition (e.g., through synchronization signals) or through a beam refinement procedure where the UE 115-a and base station 105-a try various combinations of finer transmission beams and receive beams until a suitable beam pair is determined. Although the above examples are described in terms of downlink transmissions, the same concepts may be extended to uplink transmissions in accordance with aspects of the present disclosure. That is, the receive beams 210 illustrated in FIG. 2 may alternatively represent transmit beams for uplink signals from UE 115-a, and base station 105-a may receive the uplink signals using one or more receive beams. In some cases, each beam pair may be associated with a signal quality (e.g., such that UE 115-a and base station 105-a may preferentially communicate over a beam pair with a better signal quality).

As described above, a significant challenge in some wireless systems (e.g., mmW systems) is that of high path loss. Accordingly, techniques (e.g., hybrid beamforming), which may not be present in legacy systems (e.g., 3G and 4G systems), may be utilized to overcome path loss and improve communications efficiency. For example, hybrid beamforming may permit multi-beam operation to users, which may enhance the link budget (e.g., resource efficiency) and SNR within wireless communications system 200.

In some cases, base station 105-a and UE 115-a may communicate over one or more active beam pairs, as described above. Each beam pair may carry one or more channels. Examples of such channels include a physical downlink shared channel (PDSCH), a physical downlink control channel (PDCCH), a physical uplink shared channel (PUSCH), and a physical uplink control channel (PUCCH).

In multi-beam operation, one or more active beam pairs may become misaligned (e.g., which may be referred to herein as a beam failure). This misalignment may be the result of beam switch failure, signal blockage, etc. In such a scenario, base station 105-a and UE 115-a may not be able to communicate (e.g., data or control information) over the misaligned active beams.

In some cases, UE 115-a may detect the beam failure by monitoring a subset of reference beams or signals, such as synchronization signals or reference signals. For example, these signals may include a synchronization signal (e.g., an NR synchronization signal (NR-SS) that includes a primary synchronization signal (PSS) and a secondary synchronization signal (SSS)) and one or more reference signals (e.g., a mobility reference signal (MRS)). In other examples, these signals may include a synchronization signal block (SS block) that includes, for example, the PSS, the SSS, and/or a physical broadcast channel (PBCH). In some cases, these signals may be multiplexed (e.g., time or frequency multiplexed) in the same region of a resource grid. In some cases, one or more of the reference signals may be transmitted using multi-port transmission (e.g., a given analog beam may comprise up to an eight-port digital transmission). Upon detection of a beam failure (e.g., which may also be referred to as a link failure), UE 115-*a* may attempt to access uplink resources to reconnect with the serving cell (e.g., by sending information for reestablishment of a beam pair). In aspects of the multi-beam operation described herein, uplink resources may be configured so that base station 105-*a* may create a receive beam in those directions from which the UE(s) 115 are transmitting.

In some systems, SR resources may be multiplexed (e.g., time or frequency multiplexed) with RACH resources such that the sets of resources may overlap in time but occupy different resource blocks. The SR resources and RACH resources may be included in a control region, which may alternatively be referred to as a RACH. In some systems, the NR-SS for a given active beam may be mapped to resources in the RACH region (e.g., such that the NR-SS of each beam is mapped to separate resources in the RACH region). Accordingly, SR resources (e.g., or RACH resources) in the control region of a resource grid may be used to convey the beam recovery request.

However, such an implementation may have drawbacks. As an example, the RACH region may carry a limited amount of information (e.g., because the RACH and SR share resources). Additionally or alternatively, using RACH or SR resources for beam recovery may be associated with relatively high latency (e.g., because these resources may be available infrequently), resulting in relatively long periods of time (e.g., on the order of 100 ms) before UE 115-*a* is able to send the beam recovery information. Further, because the RACH resources may be contention-based, UE 115-*a* may not be able to access these periodically allocated resources. Because of the limited capacity of the resources in the control region, the information contained in the beam recovery request may also be limited. Accordingly, in some systems, UE 115-*a* may be allocated (e.g., additional) resources over which beam recovery information is communicated to base station 105-*a*.

In aspects of the present disclosure, base station 105-*a* may configure dedicated resources (e.g., resource elements (REs)) to one or more UEs 115 such that beam recovery may not be restricted to the NR-SS associated resources in the control region. In some cases, the configuration may be sent using RRC signaling, or may be sent using a system information broadcast. The configuration may be enabled and disabled using L1/L2 signaling. That is, UE 115-*a* may in some cases be triggered to access additional resources for the beam recovery process (e.g., through a resource grant from base station 105-*a*). Accordingly, the resources used for beam recovery may be contention-free, and UE 115-*a* may access the dedicated resources once triggered (or granted) by base station 105-*a*. Additionally or alternatively, the configuration may be specific to a UE 115 (or a group of UEs 115). In some cases, the configuration may be traffic dependent. For example, e.g. to reduce beam recovery delay, base station 105-*a* may configure a set of UEs 115 with uplink resources that occur more frequently in time. Alternatively, in a low-traffic scenario (e.g., when UE 115-*a* has a relatively small amount of data to transmit), the SR resources in the RACH region may suffice (e.g., because delays may be more tolerable in such a scenario). In some aspects, base station 105-*a* may configure UEs 115 that have a high SNR to use any beam on the uplink for beam recovery.

In some cases, base station 105-*a* may specify a SFN, periodicity, REs, a slot or mini-slot, an SFI, etc. for the uplink resources. As an example, the number of REs configured per uplink beam may vary depending on the number of UEs 115 that are using the beam. Accordingly, base station 105-*a* may specify a total number of beam recovery requests to be made by UE 115-*a*, which may be based on the number of configured REs or based on other conditions (e.g., a timer). In some cases, base station 105-*a* may configure more frequency or time resources in certain beams (e.g., for a larger payload) than in other beams. Additionally, the configured resources may be in a region other than the RACH region.

Base station 105-*a* may specify a relationship between downlink beams and uplink resources. That is, base station 105-*a* may provide equivalent uplink resources for each downlink beam. In some cases, the downlink beams may be based on, for example, one or more of an NR-SS, an MRS, or a CSI-RS (e.g., a periodic CSI-RS). In aspects of the present disclosure, respective reference signals may be associated with its own dedicated uplink resources. The periodicity of the dedicated uplink resources may be based on the periodicity of the associated reference signal. That is, the periodicity of the uplink resources may be greater than, equal to, or less than the periodicity of associated reference signals. By way of example, the periodicity of the uplink resources may be a multiple (e.g., an integer multiple) of the associated reference signal. Different relationships between the periodicities of reference signals and uplink resources not stated herein are also contemplated, including those based on a relationship or a correlation between the uplink resources and one or more reference signals. In some cases, the measurement reference signals (e.g., MRS and CSI-RS) may be transmitted more frequently than the NR-SS.

UE 115-*a* may determine beam failure on one or more active beams and use the configured resources to send a beam recovery message. For example, UE 115-*a* may monitor a set of reference signals to determine whether a beam failure has occurred (e.g., whether a beam failure condition has been met), and transmit the beam recovery message based on a determination that an active beam has failed. The beam recovery message may be sent over one or more uplink resources and/or in one or more beam directions. The beam recovery message may contain measurements of reference signals from one or more beams or one or more cells. In some cases, these measurements may be performed before and/or after beam failure is detected. That is, in some cases, the periodicity of the dedicated uplink resources may be lower than the periodicity of the reference signals such that UE 115-*a* may continue measuring reference signals while waiting for the dedicated uplink resources. The reference signals may include NR-SS, MRS, and CSI-RS. Measurement results may include an indication of RSRP, RSRQ, CQI, PMI, rank indicator (RI), and the like. In some cases, UE 115-*a* may also provide direction information (e.g., a mobility condition including a direction of UE 115-*a*, a distance from base station 105-*a*, an orientation of UE 115-*a*, etc.) and/or UE panel information (e.g., a number of antennas or antenna arrays at UE 115-*a*).

In some cases, UE 115-*a* may specify a downlink beam identifier (e.g., explicitly and/or implicitly by using the appropriately mapped uplink resources for the given downlink beam). For instance, UE 115-*a* may identify, within the beam recovery message, one or more candidate beams (e.g., using a beam identifier) that may be used for beam recovery. In such cases, the beam recovery message may further include information regarding a signal quality of the candidate beam(s) (e.g., based on the measurements of reference signals on the candidate beams). In other examples, UE 115-*a* may send information in the beam recovery request that indicates whether a candidate beam exists based on the performed measurements.

Base station 105-*a* may receive one or more beam recovery messages from UE 115-*a*. Because the identity of UE 115-*a* may be known to base station 105-*a*, base station 105-*a* may respond to a subset of the beam recovery messages. That is, in some cases, multiple UEs 115 may transmit simultaneously over the same resources, and base station 105-*a* may distinguish the transmissions based on a scrambling code (e.g., which may be based on a cell radio network temporary identifier (C-RNTI) for RRC-connected UEs 115). In some cases, base station 105-*a* may respond with a confirmation of a candidate beam indicated by UE 115-*a*, or may signal a different beam for beam recovery. The beam chosen by base station 105-*a* may rely on the measurement report received in the beam recovery message. For example, base station 105-*a* may choose to use another beam (e.g., a refined beam) if the measurement report message suggests that UE 115-*a* can use the same receive beam to receive the other beam (e.g., the refined beam). In some cases, a transmit beam chosen by base station 105-*a* may rely on uplink measurements performed at base station 105-*a*. The PDCCH transmitted to UE 115-*a* may indicate the presence of additional reference signal(s) for beam refinement. In other examples, a beam may not be available for beam recovery.

Figure 3:
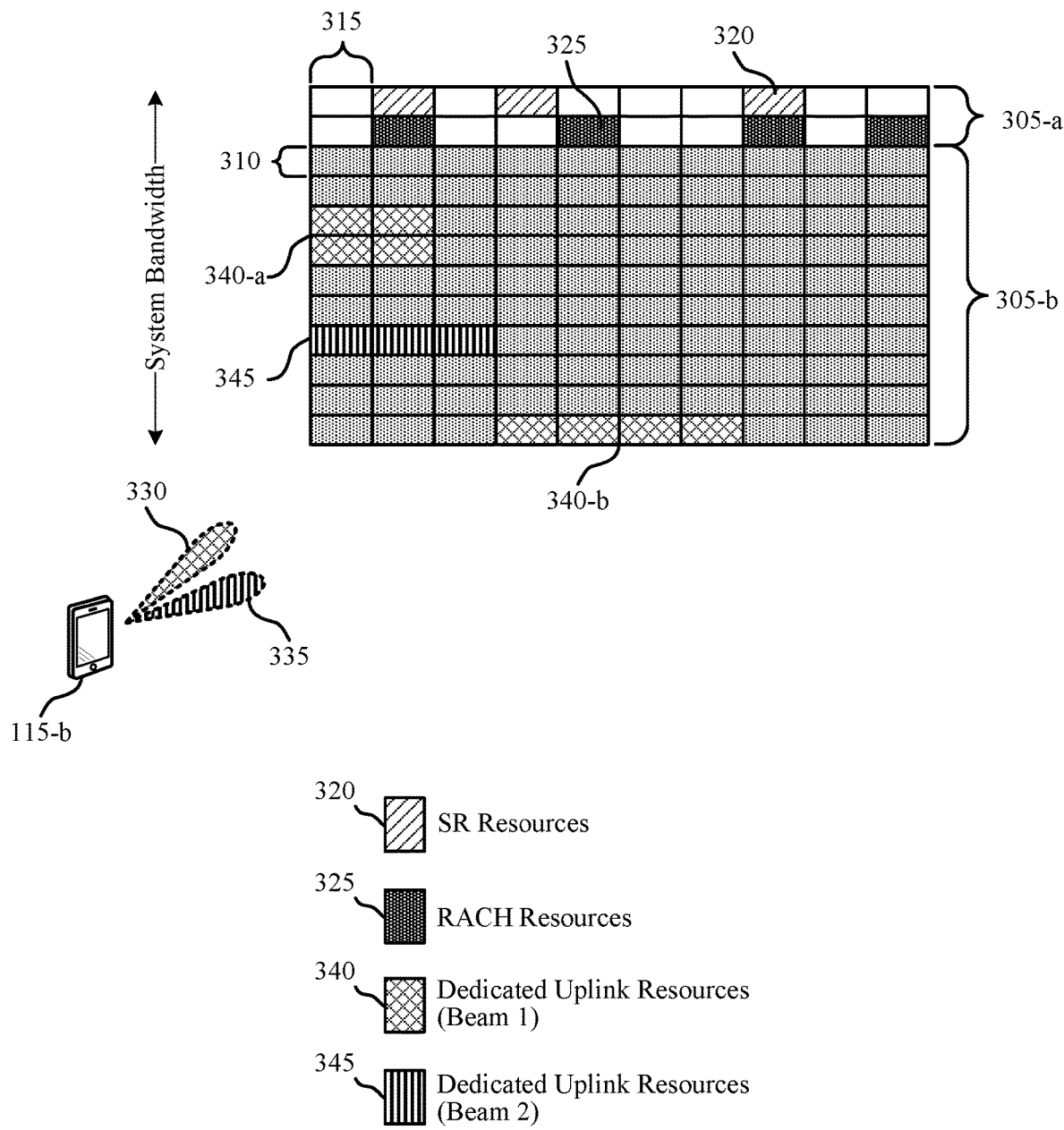
FIG. 3 illustrates an example of a resource grid in a system that supports uplink resources for beam recovery in accordance with aspects of the present disclosure.

FIG. 3 illustrates an example of a resource grid 300 in a system that supports dedicated uplink resources for beam recovery in accordance with various aspects of the present disclosure. The resource grid 300 may, for example, be used by a UE 115 as described with reference to FIGS. 1 and 2. Resource grid 300 may be associated with a given beam pair between a serving base station 105 (not shown) and UE 115-*b*. Aspects of resource grid 300 have been simplified for the sake of explanation. Accordingly, the arrangement and periodicity of the various resources described below may vary from what is depicted in FIG. 3.

Resource grid 300 may include a first subset of resources 305-*a* and a second subset of resources 305-*b* within a system bandwidth. The first and second subset of resources 305-*a* may correspond to multiple subcarriers 310 transmitted over a number of symbol periods 315 (e.g., OFDM symbols). A block spanning one symbol period 315 and one subcarrier 310 may be referred to as an RE. Alternatively, each block may span a group of subcarriers 310 (e.g., 12 subcarriers) and one subframe (e.g., a TTI), such that each block may be referred to as a resource block (RB). Accordingly, the units of frequency and time used in the present example may be arbitrary such that they are used for the sake of explanation only. The first subset of resources 305-*a* may be an example of control resources (i.e., resources over which control channel information may be transmitted). As an example, the first subset of resources 305-*a* may carry PUCCH and physical RACH (PRACH) transmissions from one or more UEs 115. In some examples, the PUCCH and/or PRACH transmissions may include the transmission of the beam recovery message using these channels. Additionally, the first subset of resources 305-*a* may contain RACH resources 325 and SR resources 320. In some cases, the RACH resources 325 and SR resources 320 may be multiplexed such that they may overlap in time or frequency (e.g., occupy the same symbol period 315 or subcarrier 310) but occupy different REs (e.g., do not overlap in both time and frequency).

The second subset of resources 305-*b* may be an example of resources in a data region of the system bandwidth. In aspects, the bandwidth of the second subset of resources 305-*b* may be wider than that of the first subset of resources 305-*a*. In some examples, resources 305-*b* may be used to carry PUSCH transmissions.

In some cases, UE 115-*b* may be able to communicate with a serving base station 105 over more than one active beam (e.g., active beams 330 and 335 in the present example). Each active beam may have an associated signal quality, and, in some cases, UE 115-*b* may preferentially communicate with the serving base station 105 over a stronger beam (e.g., active beam 330 having relatively higher SNR compared to another active beam(s)). Each active beam 330, 335 may be an example of a downlink receive beam, as described with reference to FIG. 2. Accordingly, each active beam 330, 335 may be used to receive one or more reference signals (e.g., NR-SS, MRS, CSI-RS, etc.) from the base station 105. UE 115-*b* may monitor these reference signals in the respective active beams 330, 335 (e.g., to detect a beam failure).

In some examples, active beam 330 may experience a beam failure (e.g., because of signal blockage, movement of UE 115-*b*, etc.). Accordingly, UE 115-*b* may fail to receive one or more reference signals of the active beam 330. In some cases, the UE 115-*b* may attempt to report the beam failure to the serving base station 105 using SR resources 320 and/or RACH resources 325. That is, each active beam 330, 335 may have an associated set of SR resources 320 and/or RACH resources 325 over which beam recovery information may be transmitted. However, SR resources 320 and RACH resources 325 may occur relatively infrequently within resource grid 300. Further, these resources may be examples of contention-based resources, such that UE 115-*b* may not be able to access them even when they do occur.

Thus, in some cases, a base station 105 may additionally or alternatively configure dedicated resources within the second subset of resources 305-*b* to be used to convey beam recovery information. In some cases, the dedicated resources may be mapped to specific reference signals and/or to specific active beams 330, 335. For example, active beam 330 may carry one or more of NR-SS, MRS, and CSI-RS. Each of these reference signals may have a dedicated set of resources over which beam failure information may be conveyed. Alternatively, one or more of these reference signals may share resources. As an example, UE 115-*b* may be configured to report NR-SS failure of active beam 330 using SR resources 320, MRS failure of active beam 330 using dedicated uplink resources 340-*a*, and CSI-RS failure of active beam 330 using dedicated uplink resources 340-*b*. Other mappings of reference signals for downlink active beam 330 may be possible. In some cases, an MRS and/or CSI-RS may be transmitted more frequently than an NR-SS. In some cases, dedicated uplink resources 340 may occur less frequently than the associated reference signals.

Additionally or alternatively, different sets of resources may be reserved for beam failure recovery requests for different beams. For instance, one or more sets of dedicated uplink resources 345 may be reserved to transmit beam recovery information for active beam 335 in addition to dedicated uplink resources 340 for active beam 330. In some cases, the dedicated uplink resources 340 and 345 may occur over the same resource blocks, but be differentiated because the active beams 330 and 335 may cover different directions. Such frequency reuse may not be possible in RACH resources 325 (e.g., because RACH resources 325 may be broadly allocated in all directions). In some cases, multiple UEs 115 may transmit in a given set of dedicated uplink resources 340, 345. Each UE 115 may be associated with a different C-RNTI such that each UE 115 may scramble transmissions over the dedicated uplink resources 340, 345 in accordance with respective C-RNTIs. Such multiplexing may not be possible with RACH resources 325 in which UEs 115 may use one or more common identifiers.

In some cases, the dedicated uplink resources 340, 345 may be configured to occur more frequently than the RACH resources 325 or the SR resources 320. Additionally or alternatively, the dedicated uplink resources 340, 345 may support higher data rates (e.g., have a wider bandwidth, longer duration, support higher modulation and coding schemes (MCS), etc.) than the RACH resources 325 or the SR resources 320. Accordingly the dedicated uplink resources 340, 345 may be able to carry additional beam recovery information, as described above with reference to FIG. 2. In some examples, the additional information carried in dedicated uplink resources 340, 345 may include an SR transmitted to the base station 105 (e.g., included in the beam recover request message).

In some cases, UE 115-b may default to attempting to transmit a beam recovery message over the SR resources 320. In some examples, UE 115-b may not be able to access the SR resources 320 and may subsequently attempt to access RACH resources 325. UE 115-b may receive a configuration (e.g., via RRC signaling) specifying which resources are dedicated for transmission of beam recovery message (e.g., which time, frequency, and beam resources may be used), and UE 115-b may autonomously decide to access the dedicated uplink resources 340, 345. Additionally or alternatively, UE 115-b may be triggered (e.g., via L1/L2 signaling) to use these dedicated uplink resources 340, 345.

Figure 4:
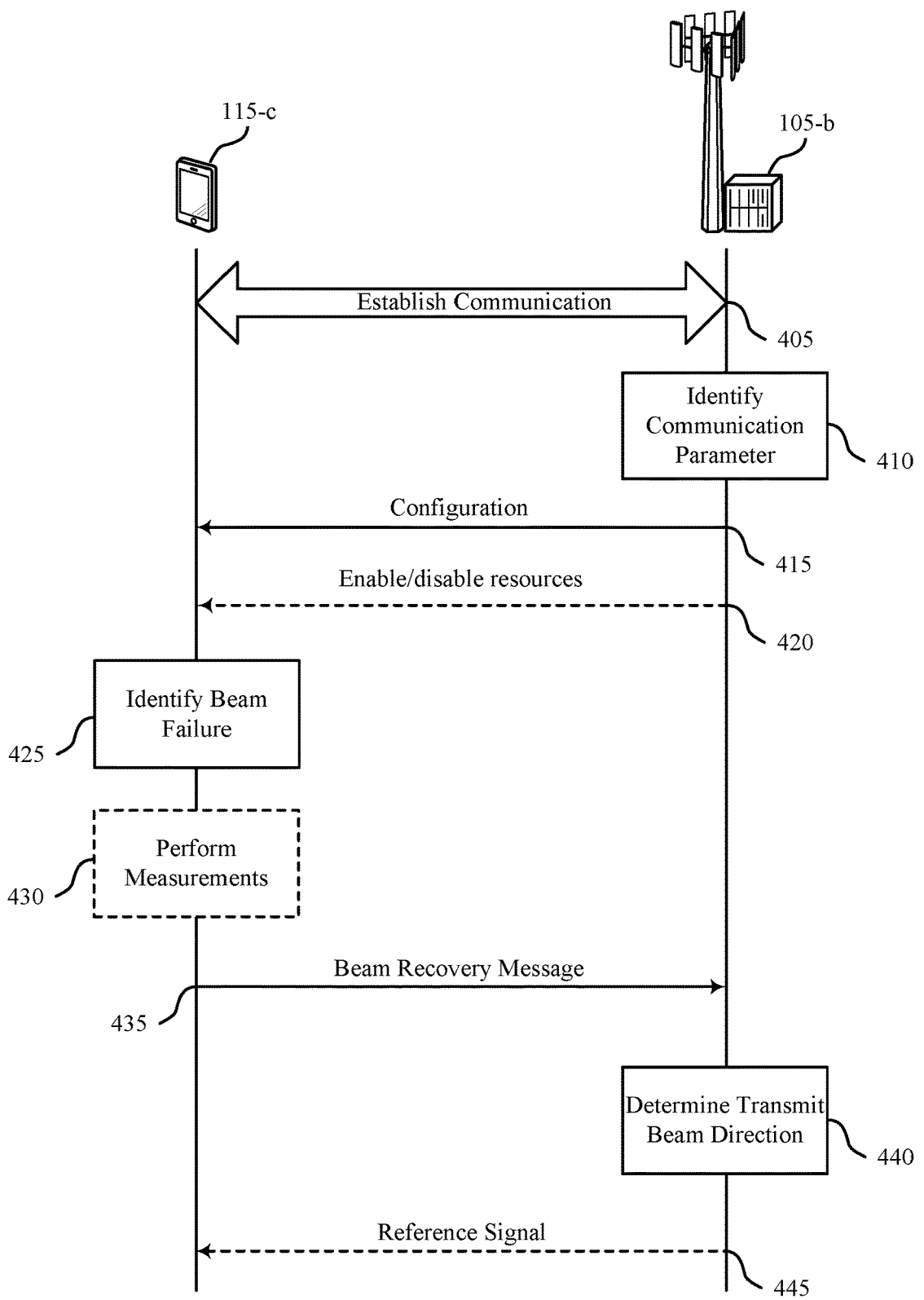
FIG. 4 illustrates an example of a process flow in a system that supports uplink resources for beam recovery in accordance with aspects of the present disclosure.

FIG. 4 illustrates an example of a process flow 400 in a system that supports uplink resources for beam recovery in accordance with various aspects of the present disclosure. Process flow 400 includes a UE 115-c and base station 105-b, each of which may be an example of the corresponding devices described above with reference to FIGS. 1 through 3. Process flow 400 may illustrate an example of the signaling of dedicated uplink resources used for the transmission of a beam recovery message.

At 405, UE 115-c and base station 105-b may establish a communication using one or more active beams. At 410, base station 105-b may identify a communication parameter associated with one or more active beams over which base station 105-b is communicating with UE 115-c. In some cases, the base station 105-b may identify a traffic level associated with UE 115-c (e.g., or a group of UEs 115). Additionally or alternatively, base station 105-b may identify an SNR associated with the communication with UE 115-c established at 405. In some cases, base station 105-b may identify a payload associated with an uplink transmission from UE 115-c.

At 415, the base station 105-b may transmit (e.g., and UE 115-c may receive) a configuration for uplink beam recovery resources. In some cases, the uplink beam recovery resources are associated with a first region of resources that are different from a second region of resources allocated for transmission of a random access message (e.g., for RACH messages). In some cases, base station 105-b may transmit the configuration as part of RRC signaling. Additionally or alternatively, the configuration may be transmitted using a system information broadcast.

Accordingly, UE 115-c may receive the configuration as part of RRC signaling or as part of the system information broadcast from base station 105-b. In some examples, the configuration of the uplink resources depends on one or more of the communication parameters determined at 410. For example, the uplink resource configuration may be based on the identified traffic level and be transmitted to one or more UEs 115. Additionally or alternatively, the uplink resource configuration may be specific to UE 115-c based on the SNR associated with UE 115-c. In some aspects, the configuration may include an indication of additional beam recovery resources allocated for one or more beam recovery messages based at least on the identified payload. In some cases, the configuration may include an indication of a set of beams for each of one or more beam recovery messages.

In some cases, base station 105-b may identify one or more reference signals associated with a set of downlink beams and may identify a mapping between uplink beam recovery resources and the set of downlink beams based on the reference signals. Base station 105-b may include an indication of the mapping as part of the configuration at 415. In some cases, the configuration includes an indication of an SFN corresponding to the uplink beam recovery resources, an SFI corresponding to the uplink beam recovery resources, a periodicity corresponding to the uplink beam recovery resources, one or more REs corresponding to the uplink beam recovery resources, or a combination thereof.

At 420, base station 105-b may optionally enable or disable the use of the uplink beam recovery resources for the transmission of the beam recovery message. In some cases, the indication that enables or disables the use of the resources may be sent using L1/L2 signaling. At 425, UE 115-c may identify a beam failure of one or more active beams used for the communication established at 405.

At 430, UE 115-c may optionally perform measurements of various signals received from base station 105-b. In some cases, these measurements may be performed before and/or after the beam failure is identified at 425. In some cases, UE 115-c may perform measurements of a set of reference signals. The set of reference signals may be associated with the one or more active beams established at 405. In some cases, the set of reference signals includes a synchronization signal, a MRS, a CSI-RS, or a combination thereof. In some cases, UE 115-c may determine a mobility condition associated with UE 115-c, the mobility condition of UE 115-c including a direction of UE 115-c relative to base station 105-b, an orientation of UE 115-c, a distance to base station 105-b, or a combination thereof. In some cases, UE 115-c may identify antenna array information corresponding to one or more antenna arrays located at UE 115-c. In some cases, the antenna array information includes a number of antenna arrays located at UE 115-c.

At 435, UE 115-c may transmit (e.g., and base station 105-b may receive) a beam recovery message according to the received configuration using the uplink beam recovery resources based on the beam failure identified at 425. The beam recovery message may comprise a transmission of a beam failure recovery request. In some cases, base station 105-b may receive one or more beam recovery messages on a set of resources in one or more receive beam directions. In some cases, UE 115-c may transmit the beam recovery message on one or more resources in one or more beam directions. In aspects, the beam recovery message may be transmitted using at least one of the plurality of beams indicated in the configuration at 415 (e.g., based on an SNR associated with UE 115-c). In some examples, UE 115-c may transmit, according to the configuration received at 415, an SR to base station 105-b using the uplink beam recovery resources. In some cases, UE 115-c may transmit the beam recovery message based on the indication at 420 that enables or disables the use of the uplink beam resources for transmission of the beam recovery message.

In some examples, the beam recovery message may include a measurement report based on the measurements performed at 430. The measurement report may include, for example, an RSRP, RSRQ, CQI, PMI, a rank (e.g., an RI), or a combination thereof. Additionally or alternatively, the beam recovery message may include an indication of the mobility condition determined at 430. The beam recovery message may, in some cases, include an indication of the antenna array information determined at 430. In some examples, UE 115-c may determine an identity of one or more downlink beams from base station 105-b and include an indication of the identity as part of the beam recovery message.

At 440, base station 105-b may determine a transmit beam direction based on the measurement report included in the beam recovery message received at 435. In some cases, base station 105-b may perform a measurement on uplink signals over the one or more active beams and determine the transmit beam direction based on the measurement of the uplink signals. At 445, base station 105-b may transmit (e.g., and UE 115-c may receive) a message in response to the transmitted beam recovery message, the message including an indication of one or more reference signals for beam refinement. In some cases, this message may be transmitted to UE 115-c using the transmit beam direction determined at 440.

Figure 5:
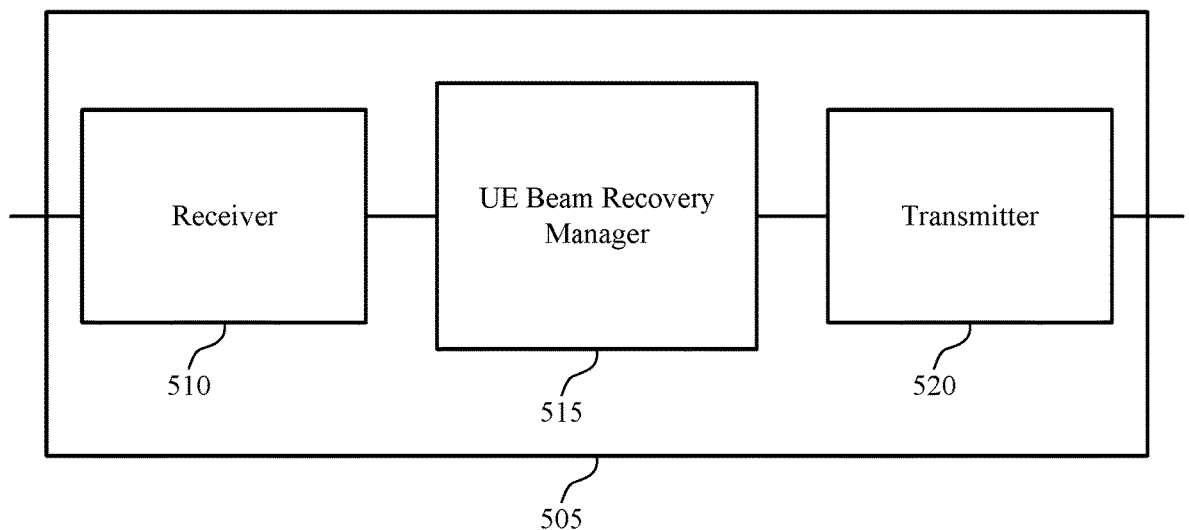
FIGS. 5 through 7 show block diagrams of a device that supports uplink resources for beam recovery in accordance with aspects of the present disclosure.

FIG. 5 shows a block diagram 500 of a wireless device 505 that supports uplink resources for beam recovery in accordance with various aspects of the present disclosure. Wireless device 505 may be an example of aspects of a UE 115 as described with reference to FIG. 1. wireless device 505 may include receiver 510, UE beam recovery manager 515, and transmitter 520. wireless device 505 may also include a processor. Each of these components may be in communication with one another (e.g., via one or more buses).

Receiver 510 may receive information such as packets, user data, or control information associated with various information channels (e.g., control channels, data channels, and information related to uplink resources for beam recovery, etc.). Information may be passed on to other components of the device. The receiver 510 may be an example of aspects of the transceiver 835 described with reference to FIG. 8.

UE beam recovery manager 515 may be an example of aspects of the UE beam recovery manager 815 described with reference to FIG. 8. UE beam recovery manager 515 and/or at least some of its various subcomponents may be implemented in hardware, software executed by a processor, firmware, or any combination thereof. If implemented in software executed by a processor, the functions of the UE beam recovery manager 515 and/or at least some of its various subcomponents may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE beam recovery manager 515 and/or at least some of its various subcomponents may be physically located at various positions, including being distributed such that portions of functions are implemented at different physical locations by one or more physical devices. In some examples, UE beam recovery manager 515 and/or at least some of its various subcomponents may be a separate and distinct component in accordance with various aspects of the present disclosure. In other examples, UE beam recovery manager 515 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure.

UE beam recovery manager 515 may receive a configuration for beam recovery resources, identify a beam failure of one or more active beams used to communicate with a base station 105, and transmit, according to the received configuration, a beam recovery message to the base station 105 using the beam recovery resources based on the identified beam failure.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
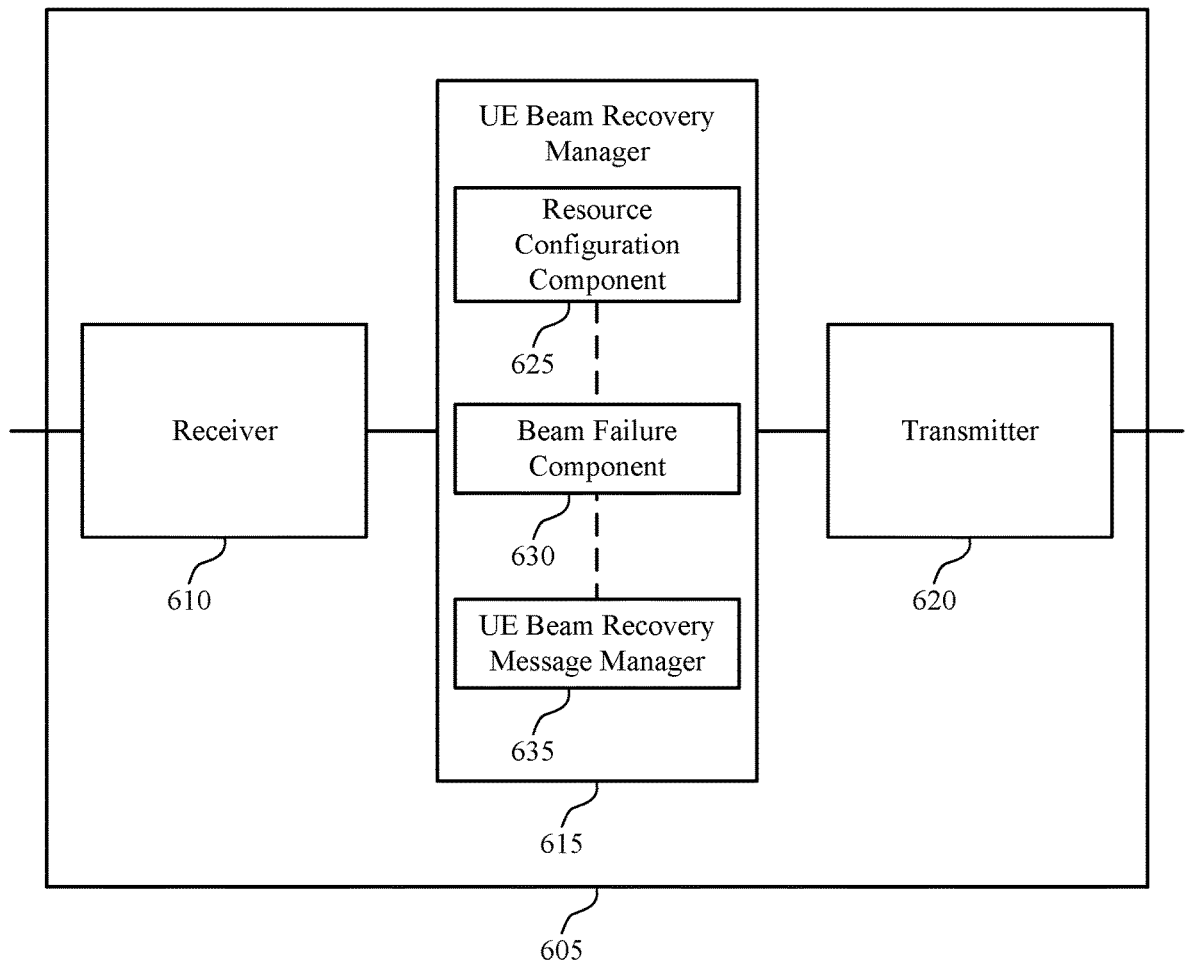

FIG. 6 shows a block diagram 600 of a wireless device 605 that supports uplink resources for beam recovery in accordance with various aspects of the present disclosure. Wireless device 605 may be an example of aspects of a wireless device 505 or a UE 115 as described with reference to FIGS. 1 and 5. wireless device 605 may include receiver 610, UE beam recovery manager 615, and transmitter 620. wireless device 605 may also include a processor. Each of these components may be in communication with one another (e.g., via one or more buses).

Receiver 610 may receive information such as packets, user data, or control information associated with various information channels (e.g., control channels, data channels, and information related to uplink resources for beam recovery, etc.). Information may be passed on to other components of the device. The receiver 610 may be an example of aspects of the transceiver 835 described with reference to FIG. 8.

UE beam recovery manager 615 may be an example of aspects of the UE beam recovery manager 815 described with reference to FIG. 8. UE beam recovery manager 615 and/or at least some of its various subcomponents may be implemented in hardware, software executed by a processor, firmware, or any combination thereof. If implemented in software executed by a processor, the functions of the UE beam recovery manager 615 and/or at least some of its various subcomponents may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE beam recovery manager 615 and/or at least some of its various subcomponents may be physically located at various positions, including being distributed such that portions of functions are implemented at different physical locations by one or more physical devices. In some examples, UE beam recovery manager 615 and/or at least some of its various subcomponents may be a separate and distinct component in accordance with various aspects of the present disclosure. In other examples, UE beam recovery manager 615 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure. UE beam recovery manager 615 may also include resource configuration component 625, beam failure component 630, and UE beam recovery message manager 635.

Resource configuration component 625 may receive a configuration for beam recovery resources. In some cases, receiving the configuration for the beam recovery resources includes receiving the configuration as part of RRC signaling from a base station 105, or as part of a system information broadcast from the base station 105. In some examples, the configuration may include a UE-specific configuration for beam recovery resources. In some cases, the configuration includes an indication of a set of beams for transmitting a beam recovery message, where the indication may be based on an SNR associated with the UE 115. In some cases, the configuration may include an indication of an SFN corresponding to the beam recovery resources, an SFI corresponding to the beam recovery resources, a periodicity corresponding to the beam recovery resources, one or more REs corresponding to the beam recovery resources, or a combination thereof. In some cases, the beam recovery resources may occupy a first region of resources that is different from a second region of resources allocated for transmission of a random access message (e.g., a RACH). In some cases, the configuration may include an indication of a mapping between a downlink beam from the base station 105 and the beam recovery resources.

Beam failure component 630 may identify a beam failure of one or more active beams used to communicate with a base station 105. UE beam recovery message manager 635 may transmit, according to the received configuration, a beam recovery message to the base station 105 using the beam recovery resources and based on the identified beam failure. In some cases, UE beam recovery message manager 635 may receive an indication that enables the use of the beam recovery resources for the transmission of the beam recovery message, where transmitting the beam recovery message is based on the indication. Additionally or alternatively, UE beam recovery message manager 635 may receive an indication that disables the use of the beam recovery resources for the transmission of the beam recovery message. In some examples, transmitting the beam recovery message to the base station 105 may include transmitting the beam recovery message using at least one of the set of beams indicated by the base station 105. In some cases, transmitting the beam recovery message to the base station 105 includes transmitting the beam recovery message on one or more resources in one or more beam directions.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
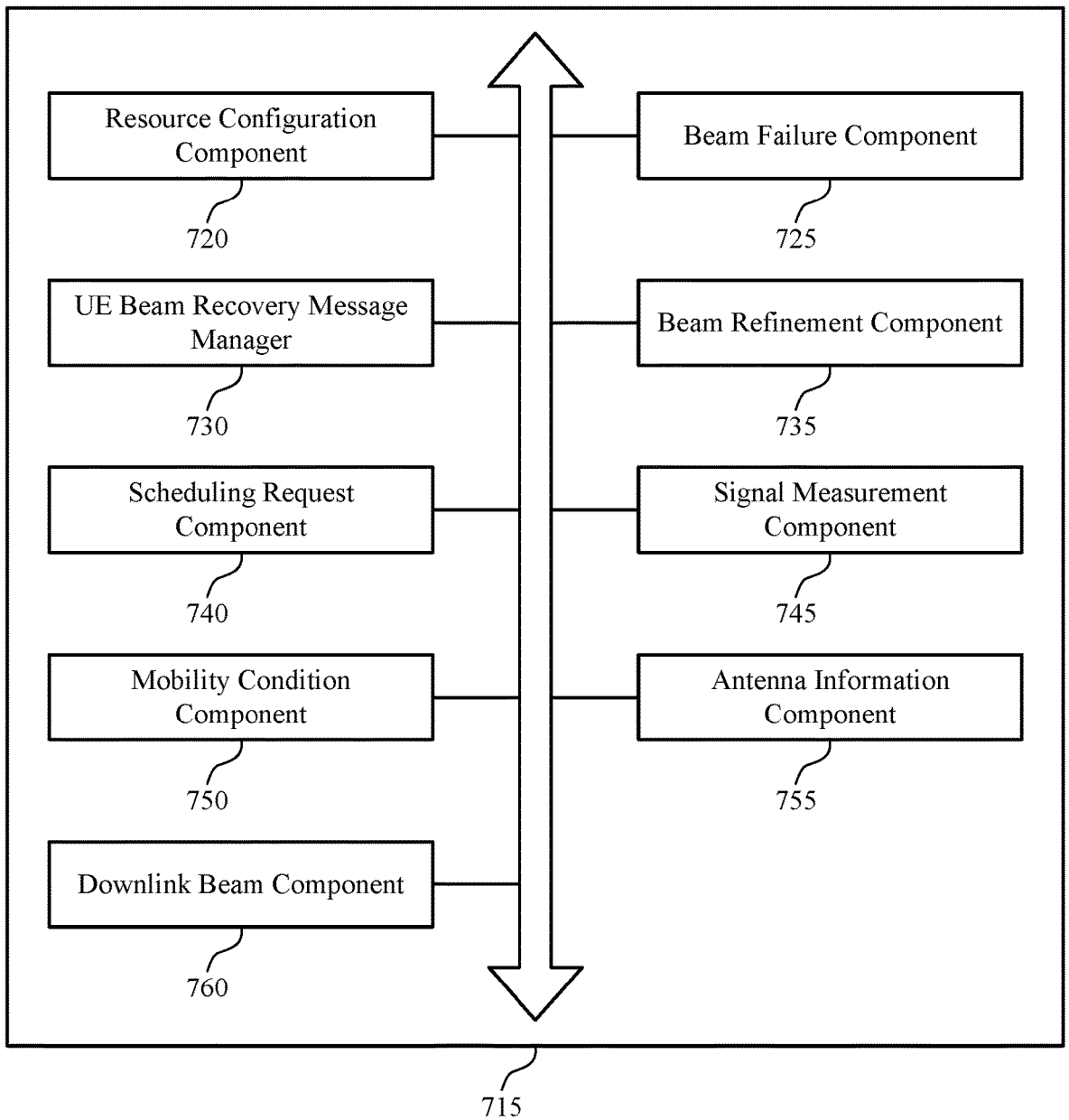

FIG. 7 shows a block diagram 700 of a UE beam recovery manager 715 that supports uplink resources for beam recovery in accordance with various aspects of the present disclosure. The UE beam recovery manager 715 may be an example of aspects of a UE beam recovery manager 515, a UE beam recovery manager 615, or a UE beam recovery manager 815 described with reference to FIGS. 5, 6, and 8.

UE beam recovery manager 715 and/or at least some of its various subcomponents may be implemented in hardware, software executed by a processor, firmware, or any combination thereof. If implemented in software executed by a processor, the functions of the UE beam recovery manager 715 and/or at least some of its various subcomponents may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE beam recovery manager 715 and/or at least some of its various subcomponents may be physically located at various positions, including being distributed such that portions of functions are implemented at different physical locations by one or more physical devices. In some examples, UE beam recovery manager 715 and/or at least some of its various subcomponents may be a separate and distinct component in accordance with various aspects of the present disclosure. In other examples, UE beam recovery manager 715 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure. The UE beam recovery manager 715 may include resource configuration component 720, beam failure component 725, UE beam recovery message manager 730, beam refinement component 735, scheduling request component 740, signal measurement component 745, mobility condition component 750, antenna information component 755, and downlink beam component 760. Each of these modules may communicate, directly or indirectly, with one another (e.g., via one or more buses).

Resource configuration component 720 may receive a configuration for beam recovery resources. In some cases, receiving the configuration for the beam recovery resources includes receiving the configuration as part of RRC signaling from a base station 105, or as part of a system information broadcast from the base station 105. In some examples, the configuration may include a UE-specific configuration for beam recovery resources. In some cases, the configuration includes an indication of a set of beams for transmitting a beam recovery message, where the indication may be based on an SNR associated with the UE 115. In some cases, the configuration may include an indication of an SFN corresponding to the beam recovery resources, an SFI corresponding to the beam recovery resources, a periodicity corresponding to the beam recovery resources, one or more REs corresponding to the beam recovery resources, or a combination thereof. In some cases, the beam recovery resources may occupy a first region of resources that is different from a second region of resources allocated for transmission of a random access message (e.g., a RACH). In some cases, the configuration may include an indication of a mapping between a downlink beam from the base station 105 and the beam recovery resources.

Beam failure component 725 may identify a beam failure of one or more active beams used to communicate with a base station 105. UE beam recovery message manager 730 may transmit, according to the received configuration, a beam recovery message to the base station 105 using the beam recovery resources and based on the identified beam failure. In some cases, UE beam recovery message manager 730 may receive an indication that enables the use of the beam recovery resources for the transmission of the beam recovery message, where transmitting the beam recovery message is based on the indication. Additionally or alternatively, UE beam recovery message manager 730 may receive an indication that disables the use of the beam recovery resources for the transmission of the beam recovery message. In some examples, transmitting the beam recovery message to the base station 105 may include transmitting the beam recovery message using at least one of the set of beams indicated by the base station 105. In some cases, transmitting the beam recovery message to the base station 105 includes transmitting the beam recovery message on one or more resources in one or more beam directions.

Beam refinement component 735 may receive a message from the base station 105 in response to the transmitted beam recovery message, the message including an indication of a set of reference signals for beam refinement. Scheduling request component 740 may transmit, according to the received configuration, an SR to the base station 105 using the beam recovery resources. Signal measurement component 745 may perform measurements of a set of reference signals, the set of reference signals associated with the one or more active beams. In such cases, the beam recovery message may include a measurement report based on the performed measurements. In some cases, the measurement report includes an RSRP, an RSRQ, a CQI, a PMI, a rank, or a combination thereof. In some cases, the set of reference signals includes a synchronization signal, a mobility reference signal, a CSI-RS, or a combination thereof.

Mobility condition component 750 may determine a mobility condition associated with the UE 115, the mobility condition of the UE 115 including a direction of the UE 115 relative to the base station 105, an orientation of the UE 115, a distance from the base station 105, or a combination thereof. In such cases, the beam recovery message may include an indication of the mobility condition. Antenna information component 755 may identify antenna array information corresponding to one or more antenna arrays located at the UE 115, where the beam recovery message includes an indication of the antenna array information. In some cases, the antenna array information includes a number of antenna arrays located at the UE 115. Downlink beam component 760 may determine an identity of a downlink beam from the base station 105, where the beam recovery message includes an indication of the identity of the downlink beam.

Figure 8:
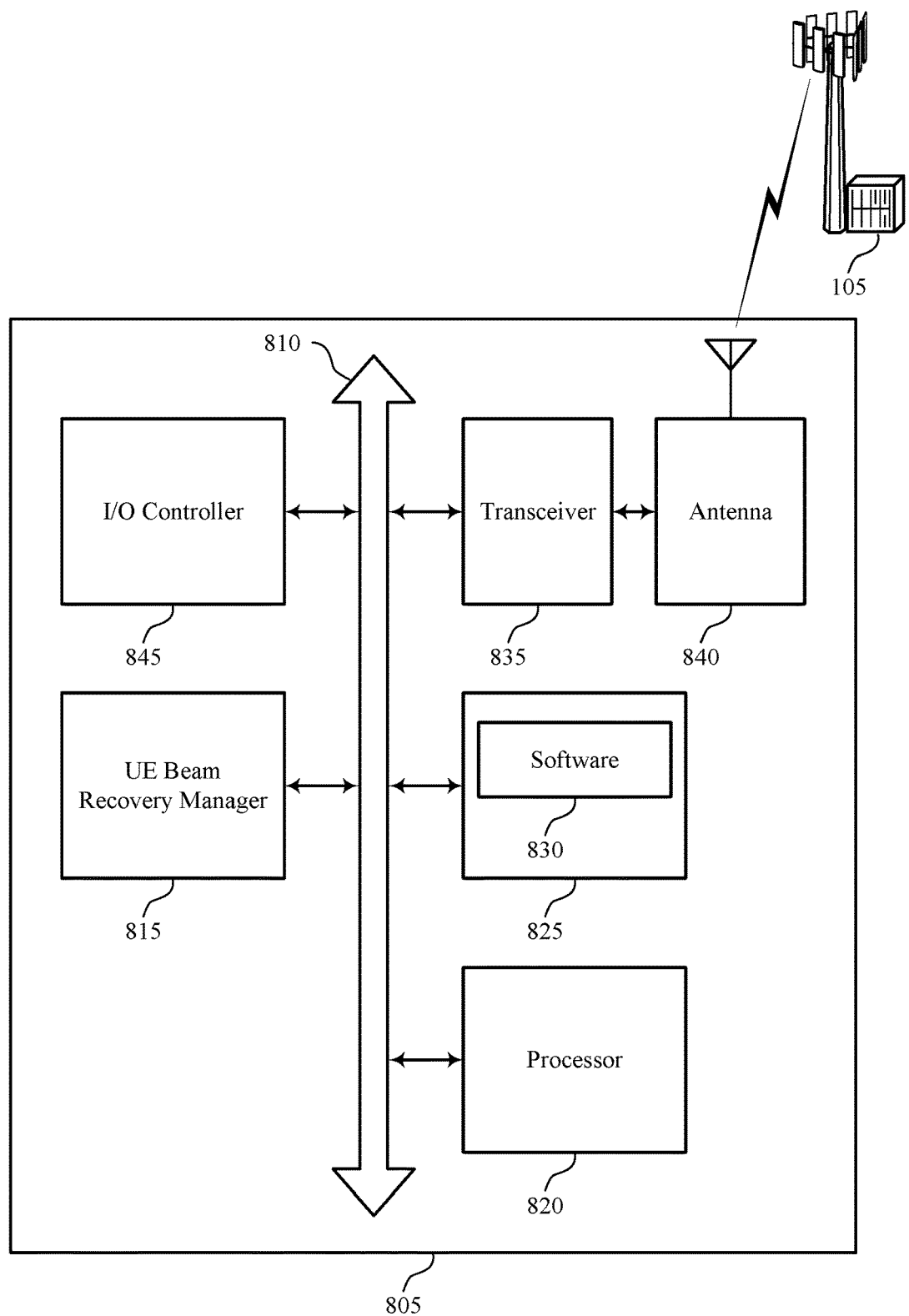
FIG. 8 illustrates a block diagram of a system including a UE that supports uplink resources for beam recovery in accordance with aspects of the present disclosure.

FIG. 8 shows a diagram of a system 800 including a device 805 that supports uplink resources for beam recovery in accordance with various aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE beam recovery manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting uplink resources for beam recovery).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support uplink resources for beam recovery. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
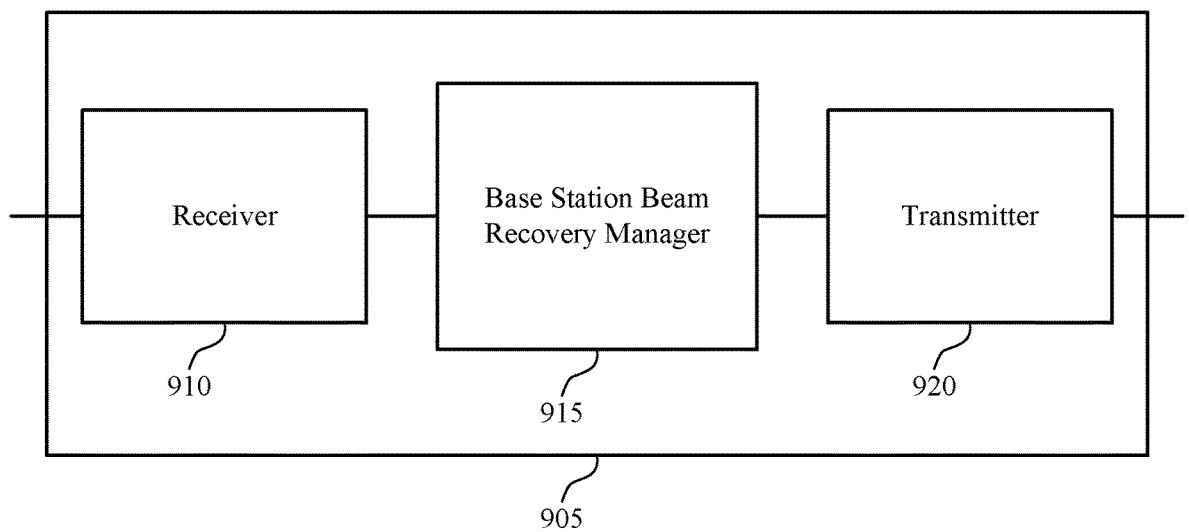
FIGS. 9 through 11 show block diagrams of a device that supports uplink resources for beam recovery in accordance with aspects of the present disclosure.

FIG. 9 shows a block diagram 900 of a wireless device 905 that supports uplink resources for beam recovery in accordance with various aspects of the present disclosure. Wireless device 905 may be an example of aspects of a base station 105 as described with reference to FIG. 1. wireless device 905 may include receiver 910, base station beam recovery manager 915, and transmitter 920. wireless device 905 may also include a processor. Each of these components may be in communication with one another (e.g., via one or more buses).

Receiver 910 may receive information such as packets, user data, or control information associated with various information channels (e.g., control channels, data channels, and information related to uplink resources for beam recovery, etc.). Information may be passed on to other components of the device. The receiver 910 may be an example of aspects of the transceiver 1235 described with reference to FIG. 12.

Base station beam recovery manager 915 may be an example of aspects of the base station beam recovery manager 1215 described with reference to FIG. 12. Base station beam recovery manager 915 and/or at least some of its various subcomponents may be implemented in hardware, software executed by a processor, firmware, or any combination thereof. If implemented in software executed by a processor, the functions of the base station beam recovery manager 915 and/or at least some of its various subcomponents may be executed by a general-purpose processor, a DSP, an ASIC, an FPGA or other programmable logic device, discrete gate or transistor logic, discrete hardware components, or any combination thereof designed to perform the functions described in the present disclosure.

Base station beam recovery manager 915 and/or at least some of its various subcomponents may be physically located at various positions, including being distributed such that portions of functions are implemented at different physical locations by one or more physical devices. In some examples, base station beam recovery manager 915 and/or at least some of its various subcomponents may be a separate and distinct component in accordance with various aspects of the present disclosure. In other examples, base station beam recovery manager 915 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure.

Base station beam recovery manager 915 may communicate with one or more UEs 115 using one or more active beams, transmit a configuration for beam recovery resources, and receive one or more beam recovery messages on the beam recovery resources, the one or more beam recovery messages indicating a beam failure of at least one of the one or more active beams.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
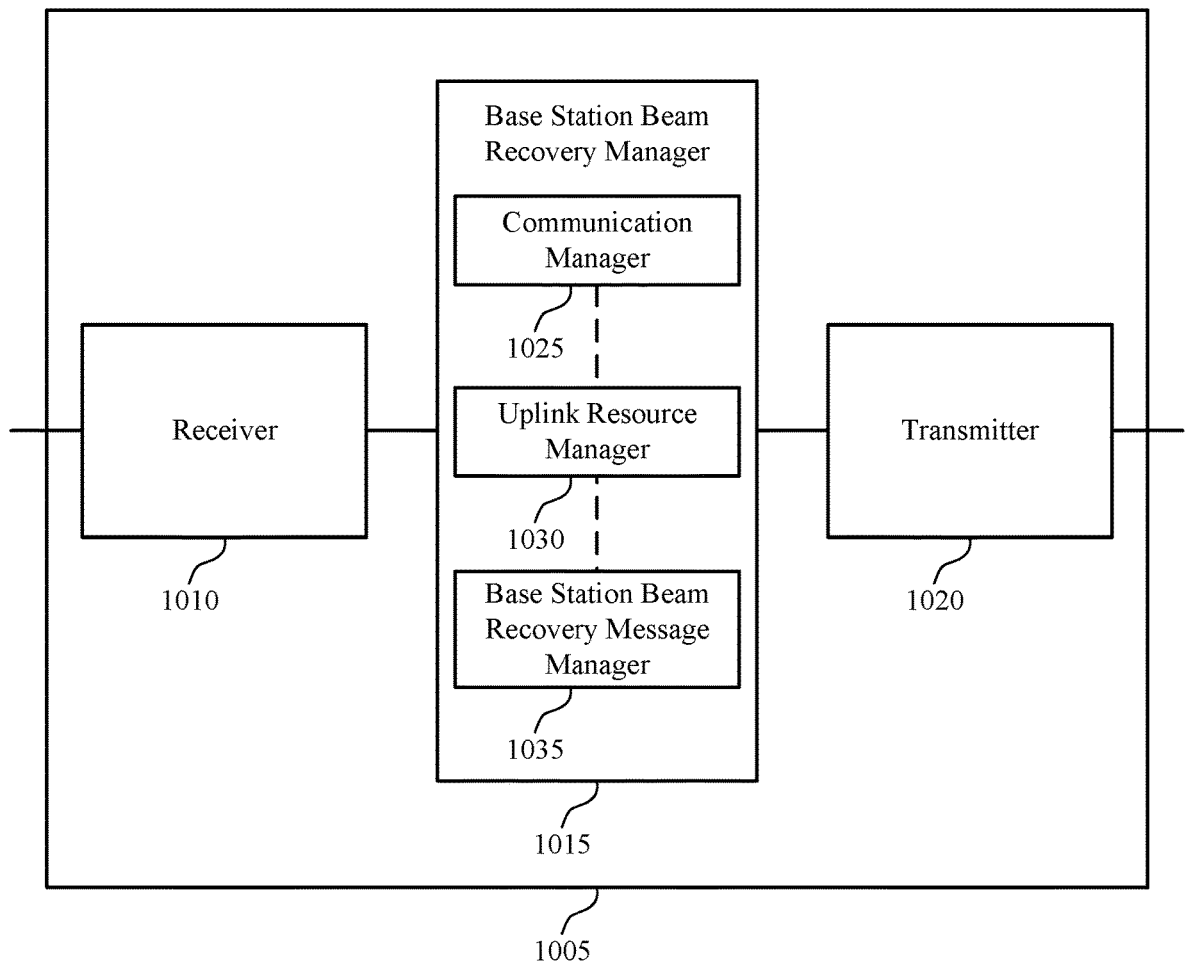

FIG. 10 shows a block diagram 1000 of a wireless device 1005 that supports uplink resources for beam recovery in accordance with various aspects of the present disclosure. Wireless device 1005 may be an example of aspects of a wireless device 905 or a base station 105 as described with reference to FIGS. 1 and 9. Wireless device 1005 may include receiver 1010, base station beam recovery manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink resources for beam recovery, etc.). Information may be passed on to other components of the device. The receiver 1010 may be an example of aspects of the transceiver 1235 described with reference to FIG. 12.

Base station beam recovery manager 1015 may be an example of aspects of the base station beam recovery manager 1215 described with reference to FIG. 12. Base station beam recovery manager 1015 and/or at least some of its various subcomponents may be implemented in hardware, software executed by a processor, firmware, or any combination thereof. If implemented in software executed by a processor, the functions of the base station beam recovery manager 1015 and/or at least some of its various subcomponents may be executed by a general-purpose processor, a DSP, an ASIC, an FPGA or other programmable logic device, discrete gate or transistor logic, discrete hardware components, or any combination thereof designed to perform the functions described in the present disclosure.

Base station beam recovery manager 1015 and/or at least some of its various subcomponents may be physically located at various positions, including being distributed such that portions of functions are implemented at different physical locations by one or more physical devices. In some examples, base station beam recovery manager 1015 and/or at least some of its various subcomponents may be a separate and distinct component in accordance with various aspects of the present disclosure. In other examples, base station beam recovery manager 1015 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure. Base station beam recovery manager 1015 may also include communication manager 1025, uplink resource manager 1030, and base station beam recovery message manager 1035.

Communication manager 1025 may communicate with one or more UEs 115 using one or more active beams. Uplink resource manager 1030 may transmit a configuration for beam recovery resources. In some examples, uplink resource manager 1030 may transmit an indication that enables the use of the beam recovery resources for the one or more beam recovery messages, where receiving beam recovery messages is based on the indication. Alternatively, uplink resource manager 1030 may transmit an indication that disables the use of the beam recovery resources for the one or more beam recovery messages. In some cases, uplink resource manager 1030 may identify a mapping between the beam recovery resources and the set of downlink beams based on the one or more reference signals, where the configuration includes an indication of the mapping.

In some cases, transmitting the configuration for the beam recovery resources includes transmitting the configuration as part of RRC signaling or as part of a system information broadcast. In some cases, the configuration includes an indication of a set of beams for each of the one or more beam recovery messages. In some cases, the beam recovery resources are associated with a first region of resources that are different from a second region resources allocated for transmission of a random access message.

Base station beam recovery message manager 1035 may receive one or more beam recovery messages on the beam recovery resources, the one or more beam recovery messages indicating a beam failure of at least one of the one or more active beams. In some cases, receiving the one or more beam recovery messages includes receiving a measurement report from the one or more UEs 115. In some cases, receiving the one or more beam recovery messages includes receiving the one or more beam recovery messages on a set of resources in one or more receive beam directions.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
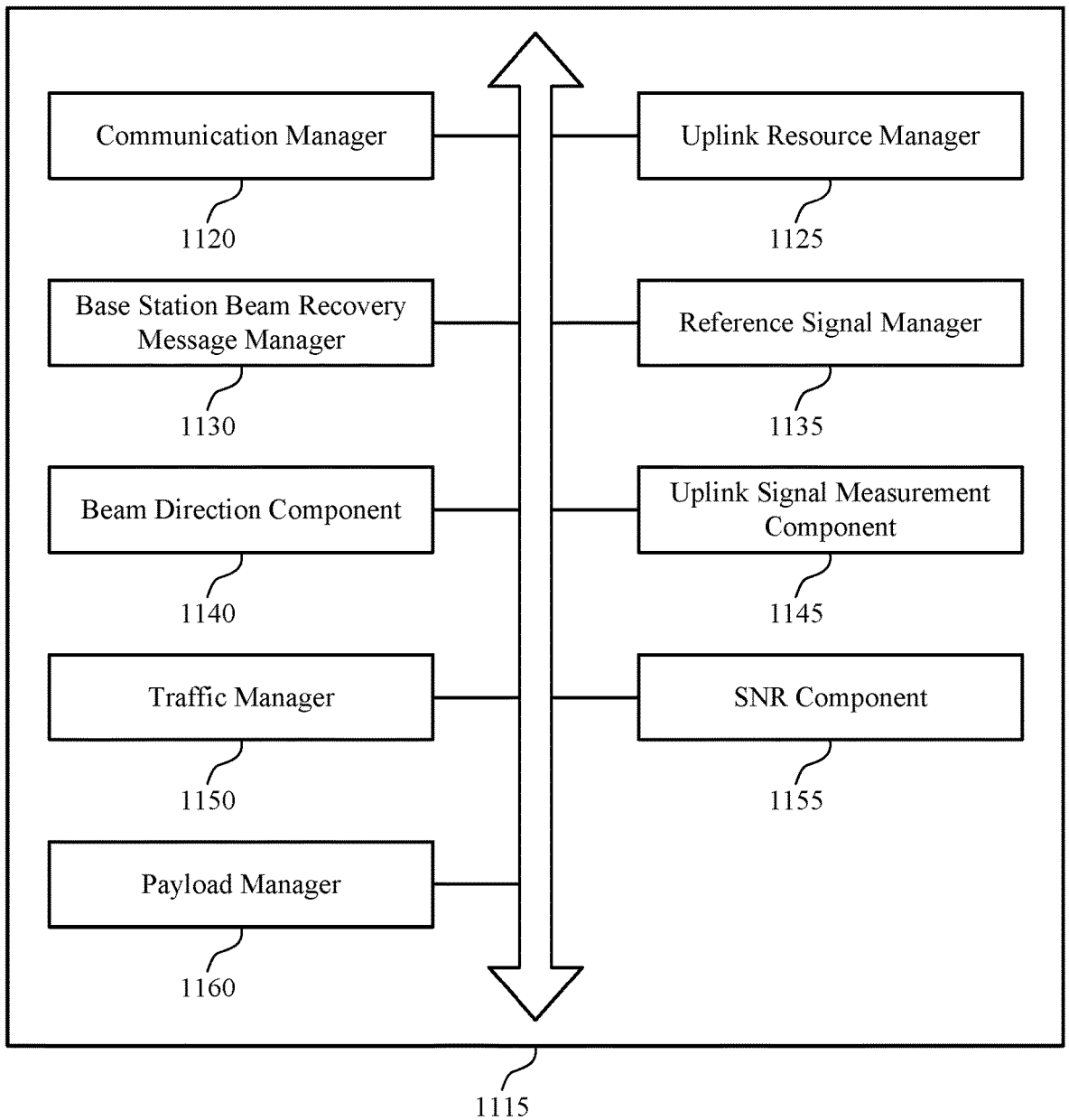

FIG. 11 shows a block diagram 1100 of a base station beam recovery manager 1115 that supports uplink resources for beam recovery in accordance with various aspects of the present disclosure. The base station beam recovery manager 1115 may be an example of aspects of a base station beam recovery manager 1215 described with reference to FIGS. 9, 10, and 12. Base station beam recovery manager 1115 and/or at least some of its various subcomponents may be implemented in hardware, software executed by a processor, firmware, or any combination thereof. If implemented in software executed by a processor, the functions of the base station beam recovery manager 1115 and/or at least some of its various subcomponents may be executed by a general-purpose processor, a DSP, an ASIC, an FPGA or other programmable logic device, discrete gate or transistor logic, discrete hardware components, or any combination thereof designed to perform the functions described in the present disclosure.

Base station beam recovery manager 1115 and/or at least some of its various subcomponents may be physically located at various positions, including being distributed such that portions of functions are implemented at different physical locations by one or more physical devices. In some examples, base station beam recovery manager 1115 and/or at least some of its various subcomponents may be a separate and distinct component in accordance with various aspects of the present disclosure. In other examples, base station beam recovery manager 1115 and/or at least some of its various subcomponents may be combined with one or more other hardware components, including but not limited to an I/O component, a transceiver, a network server, another computing device, one or more other components described in the present disclosure, or a combination thereof in accordance with various aspects of the present disclosure. The base station beam recovery manager 1115 may include communication manager 1120, uplink resource manager 1125, base station beam recovery message manager 1130, reference signal manager 1135, beam direction component 1140, uplink signal measurement component 1145, traffic manager 1150, SNR component 1155, and payload manager 1160. Each of these modules may communicate, directly or indirectly, with one another (e.g., via one or more buses).

Communication manager 1120 may communicate with one or more UEs 115 using one or more active beams. Uplink resource manager 1125 may transmit a configuration for beam recovery resources. In some examples, uplink resource manager 1125 may transmit an indication that enables the use of the beam recovery resources for the one or more beam recovery messages, where receiving beam recovery messages is based on the indication. Alternatively, uplink resource manager 1125 may transmit an indication that disables the use of the beam recovery resources for the one or more beam recovery messages. In some cases, uplink resource manager 1125 may identify a mapping between the beam recovery resources and the set of downlink beams based on the one or more reference signals, where the configuration includes an indication of the mapping.

In some cases, transmitting the configuration for the beam recovery resources includes transmitting the configuration as part of RRC signaling or as part of a system information broadcast. In some cases, the configuration includes an indication of a set of beams for each of the one or more beam recovery messages. In some cases, the beam recovery resources are associated with a first region of resources that are different from a second region resources allocated for transmission of a random access message.

Base station beam recovery message manager 1130 may receive one or more beam recovery messages on the beam recovery resources, the one or more beam recovery messages indicating a beam failure of at least one of the one or more active beams. In some cases, receiving the one or more beam recovery messages includes receiving a measurement report from the one or more UEs 115. In some cases, receiving the one or more beam recovery messages includes receiving the one or more beam recovery messages on a set of resources in one or more receive beam directions.

Reference signal manager 1135 may transmit a message in response to the received one or more beam recovery messages, the message including an indication of a set of reference signals for beam refinement and identify one or more reference signals associated with a set of downlink beams. Beam direction component 1140 may determine a transmit beam direction based on the measurement report, transmit the message to the UE 115 using the determined transmit beam direction, and determine a transmit beam direction based on the measurement of the uplink signals, where transmitting the message to the UE 115 is based on the transmit beam direction.

Uplink signal measurement component 1145 may perform a measurement on uplink signals over the one or more active beams. Traffic manager 1150 may identify a traffic level associated with a subset of the one or more UEs 115. In such cases, transmitting the configuration for beam recovery resources includes transmitting the configuration to the subset of the one or more UEs 115 based on the identified traffic level. SNR component 1155 may identify an SNR associated with the UE 115, and the configuration may include a UE-specific configuration of beam recovery resources based on the identified SNR. Payload manager 1160 may identify a payload associated with an uplink transmission from the one or more UEs 115, where the configuration includes an indication of additional beam recovery resources allocated for the one or more beam recovery messages based on the identified payload.

Figure 12:
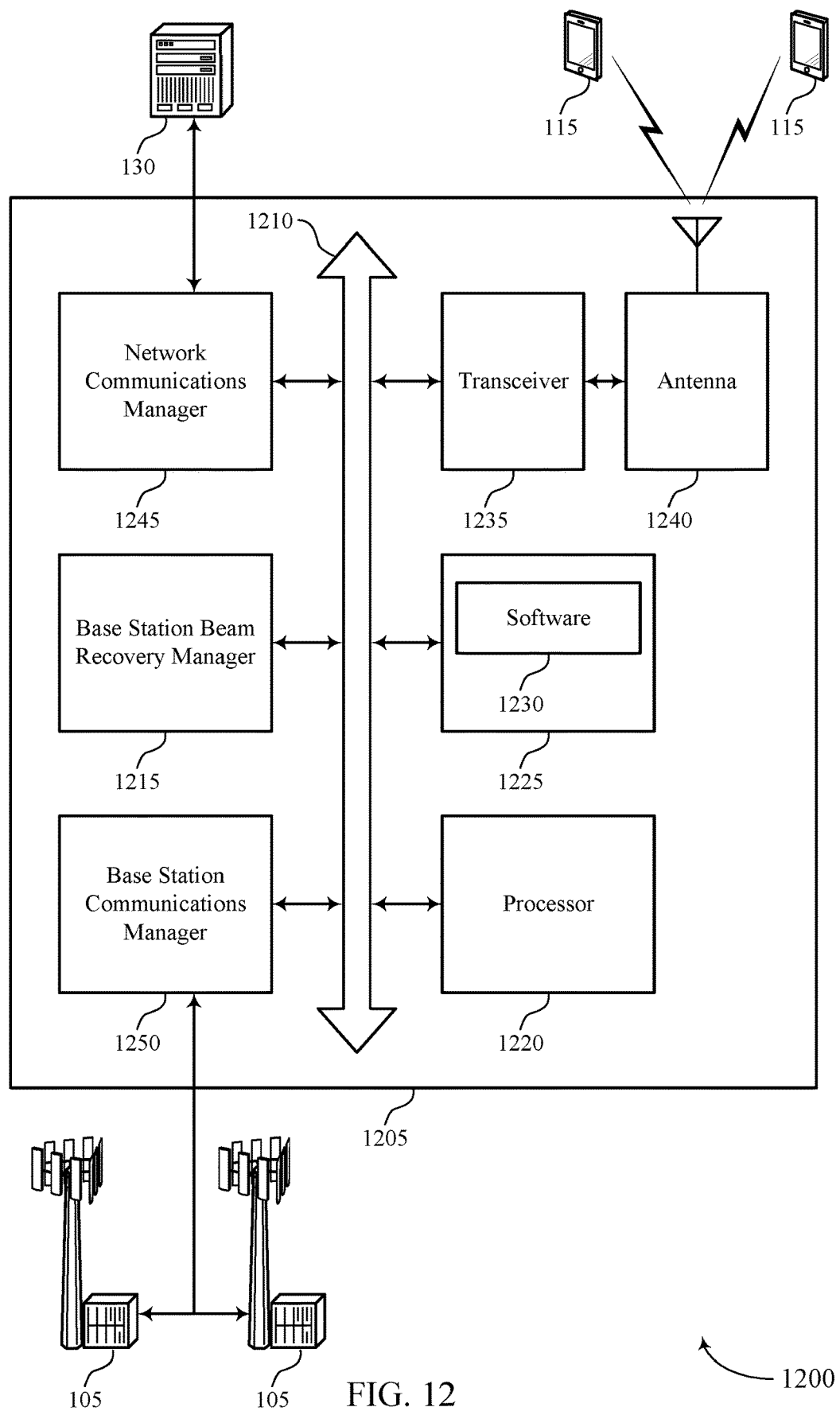
FIG. 12 illustrates a block diagram of a system including a base station that supports uplink resources for beam recovery in accordance with aspects of the present disclosure.

FIG. 12 shows a diagram of a system 1200 including a device 1205 that supports uplink resources for beam recovery in accordance with various aspects of the present disclosure. Device 1205 may be an example of or include the components of base station 105 as described above, e.g., with reference to FIG. 1. Device 1205 may include components for bi-directional voice and data communications including components for transmitting and receiving communications, including base station beam recovery manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink resources for beam recovery).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support uplink resources for beam recovery. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base stations 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an Long Term Evolution (LTE)/LTE-A wireless communication network technology to provide communication between base stations 105.

Figure 13:
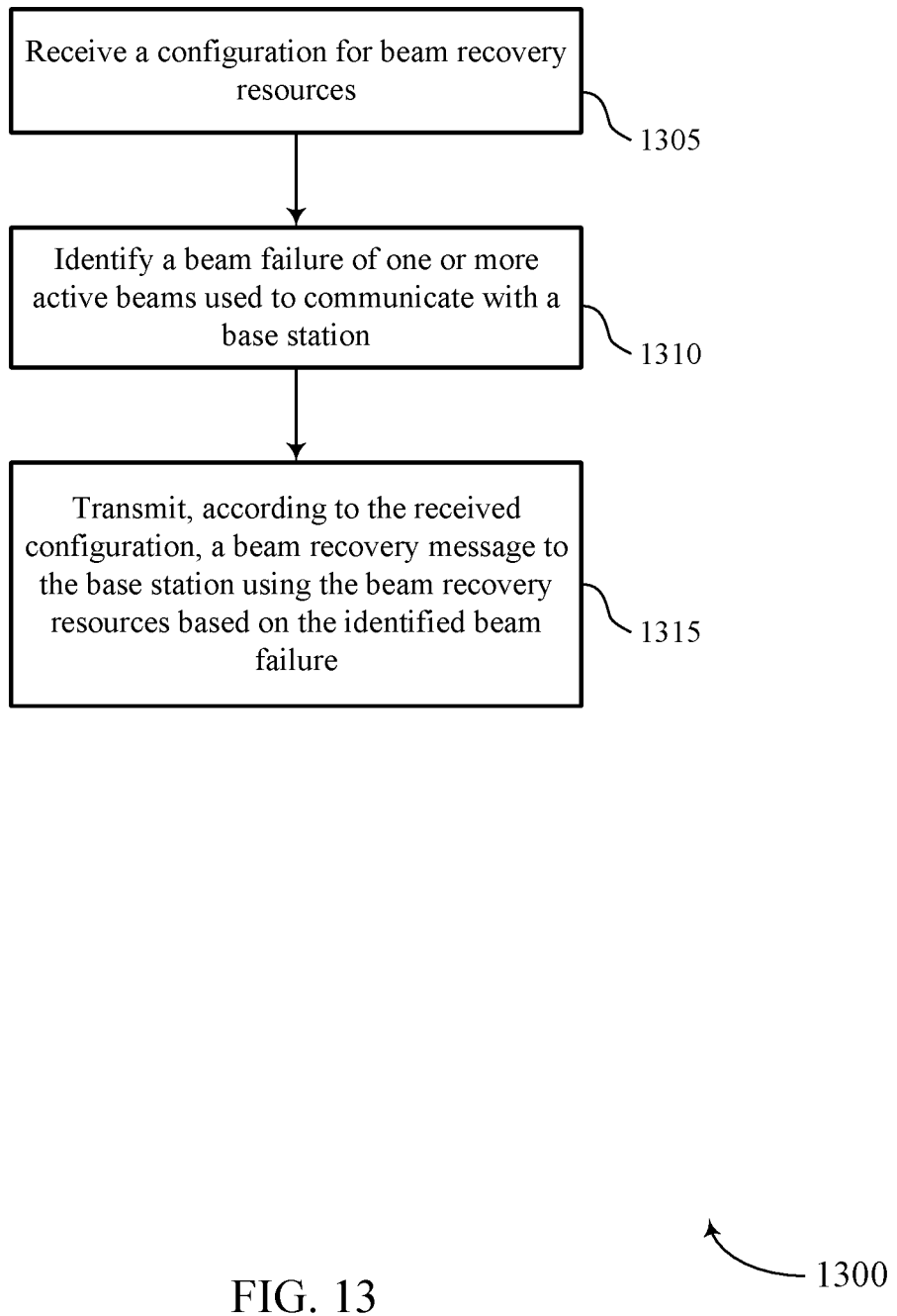
FIGS. 13 through 18 illustrate methods for uplink resources for beam recovery in accordance with aspects of the present disclosure.

FIG. 13 shows a flowchart illustrating a method 1300 for uplink resources for beam recovery in accordance with various aspects of the present disclosure. The operations of method 1300 may be implemented by a UE 115 or its components as described herein. For example, the operations of method 1300 may be performed by a UE beam recovery manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive a configuration for beam recovery resources. The operations of block 1305 may be performed according to the methods described with reference to FIGS. 1 through 4. In certain examples, aspects of the operations of block 1305 may be performed by a resource configuration component as described with reference to FIGS. 5 through 8.

At block 1310 the UE 115 may identify a beam failure of one or more active beams used to communicate with a base station 105. The operations of block 1310 may be performed according to the methods described with reference to FIGS. 1 through 4. In certain examples, aspects of the operations of block 1310 may be performed by a beam failure component as described with reference to FIGS. 5 through 8.

At block 1315 the UE 115 may transmit, according to the received configuration, a beam recovery message to the base station using the beam recovery resources based on the identified beam failure. The operations of block 1315 may be performed according to the methods described with reference to FIGS. 1 through 4. In certain examples, aspects of the operations of block 1315 may be performed by a UE beam recovery message manager as described with reference to FIGS. 5 through 8.

Figure 14:
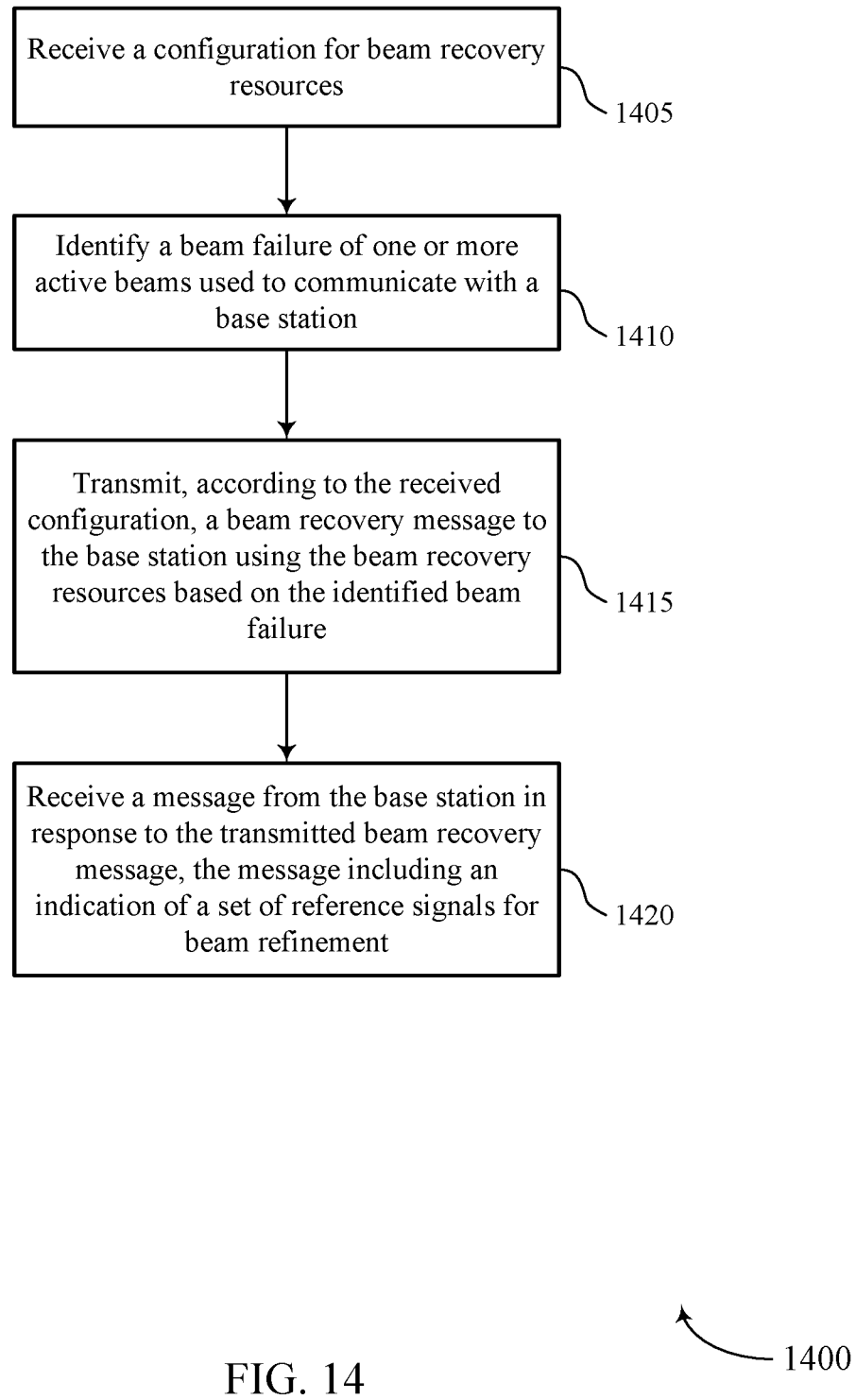

FIG. 14 shows a flowchart illustrating a method 1400 for uplink resources for beam recovery in accordance with various aspects of the present disclosure. The operations of method 1400 may be implemented by a UE 115 or its components as described herein. For example, the operations of method 1400 may be performed by a UE beam recovery manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a configuration for beam recovery resources. The operations of block 1405 may be performed according to the methods described with reference to FIGS. 1 through 4. In certain examples, aspects of the operations of block 1405 may be performed by a resource configuration component as described with reference to FIGS. 5 through 8.

At block 1410 the UE 115 may identify a beam failure of one or more active beams used to communicate with a base station 105. The operations of block 1410 may be performed according to the methods described with reference to FIGS. 1 through 4. In certain examples, aspects of the operations of block 1410 may be performed by a beam failure component as described with reference to FIGS. 5 through 8.

At block 1415 the UE 115 may transmit, according to the received configuration, a beam recovery message to the base station 105 using the beam recovery resources based on the identified beam failure. The operations of block 1415 may be performed according to the methods described with reference to FIGS. 1 through 4. In certain examples, aspects of the operations of block 1415 may be performed by a UE beam recovery message manager as described with reference to FIGS. 5 through 8.

At block 1420 the UE 115 may receive a message from the base station 105 in response to the transmitted beam recovery message, the message including an indication of a set of reference signals for beam refinement. The operations of block 1420 may be performed according to the methods described with reference to FIGS. 1 through 4. In certain examples, aspects of the operations of block 1420 may be performed by a beam refinement component as described with reference to FIGS. 5 through 8.

Figure 15:
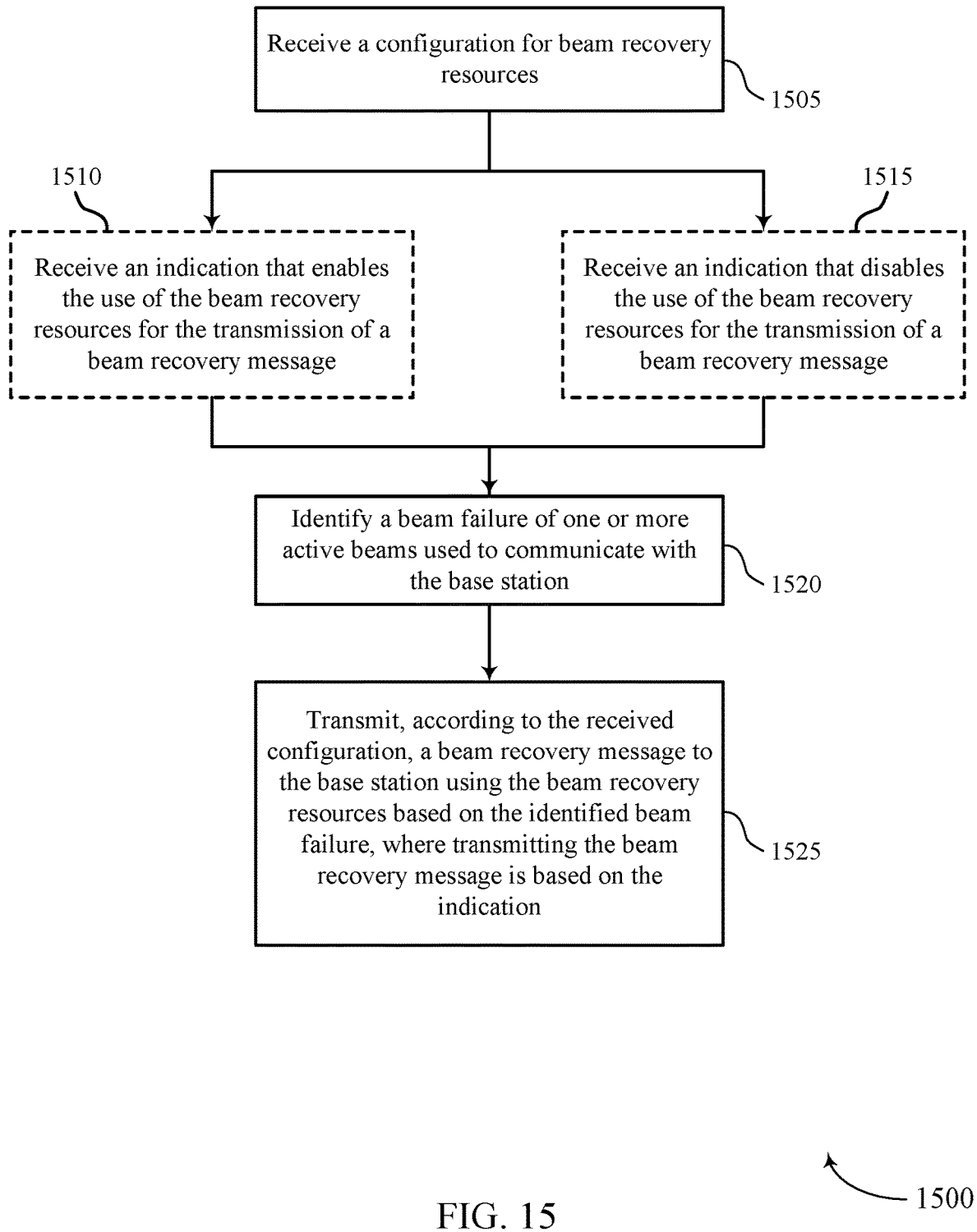

FIG. 15 shows a flowchart illustrating a method 1500 for uplink resources for beam recovery in accordance with various aspects of the present disclosure. The operations of method 1500 may be implemented by a UE 115 or its components as described herein. For example, the operations of method 1500 may be performed by a UE beam recovery manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a configuration for beam recovery resources. For example, the configuration may be received via RRC signaling, or via a system information broadcast. The operations of block 1505 may be performed according to the methods described with reference to FIGS. 1 through 4. In certain examples, aspects of the operations of block 1505 may be performed by a resource configuration component as described with reference to FIGS. 5 through 8.

At block 1510 the UE 115 may optionally receive an indication that enables the use of the beam recovery resources for the transmission of the beam recovery message. For example, the UE 115 may receive via lower layer (L1/L2 signaling) an indication to enable the use of the beam recovery resources. In such cases, the UE 115 may have previously transmitted a beam recovery message using a different set of resources (e.g., resources allocated for RACH or SR messages), and upon receiving the indication enabling the use of dedicated resources for beam recovery, may thereafter transmit beam recovery messages on the beam recovery resources. The operations of block 1520 may be performed according to the methods described with reference to FIGS. 1 through 4. In certain examples, aspects of the operations of block 1520 may be performed by a UE beam recovery message manager as described with reference to FIGS. 5 through 8.

Alternatively, at block 1515 the UE 115 may receive an indication that disables the use of the beam recovery resources for the transmission of the beam recovery message. In such cases, the UE 115 may transmit beam recovery messages according to, for example, a default scheme or configuration for transmitting beam recovery messages on uplink resources. The operations of block 1515 may be performed according to the methods described with reference to FIGS. 1 through 4. In certain examples, aspects of the operations of block 1515 may be performed by a UE beam recovery message manager as described with reference to FIGS. 5 through 8.

At block 1520 the UE 115 may identify a beam failure of one or more active beams used to communicate with a base station. The operations of block 1520 may be performed according to the methods described with reference to FIGS. 1 through 4. In certain examples, aspects of the operations of block 1520 may be performed by a beam failure component as described with reference to FIGS. 5 through 8.

At block 1525 the UE 115 may transmit, according to the received configuration, a beam recovery message to the base station using the beam recovery resources based on the identified beam failure, where transmitting the beam recovery message is based on the indication. The operations of block 1525 may be performed according to the methods described with reference to FIGS. 1 through 4. In certain examples, aspects of the operations of block 1525 may be performed by a UE beam recovery message manager as described with reference to FIGS. 5 through 8.

Figure 16:
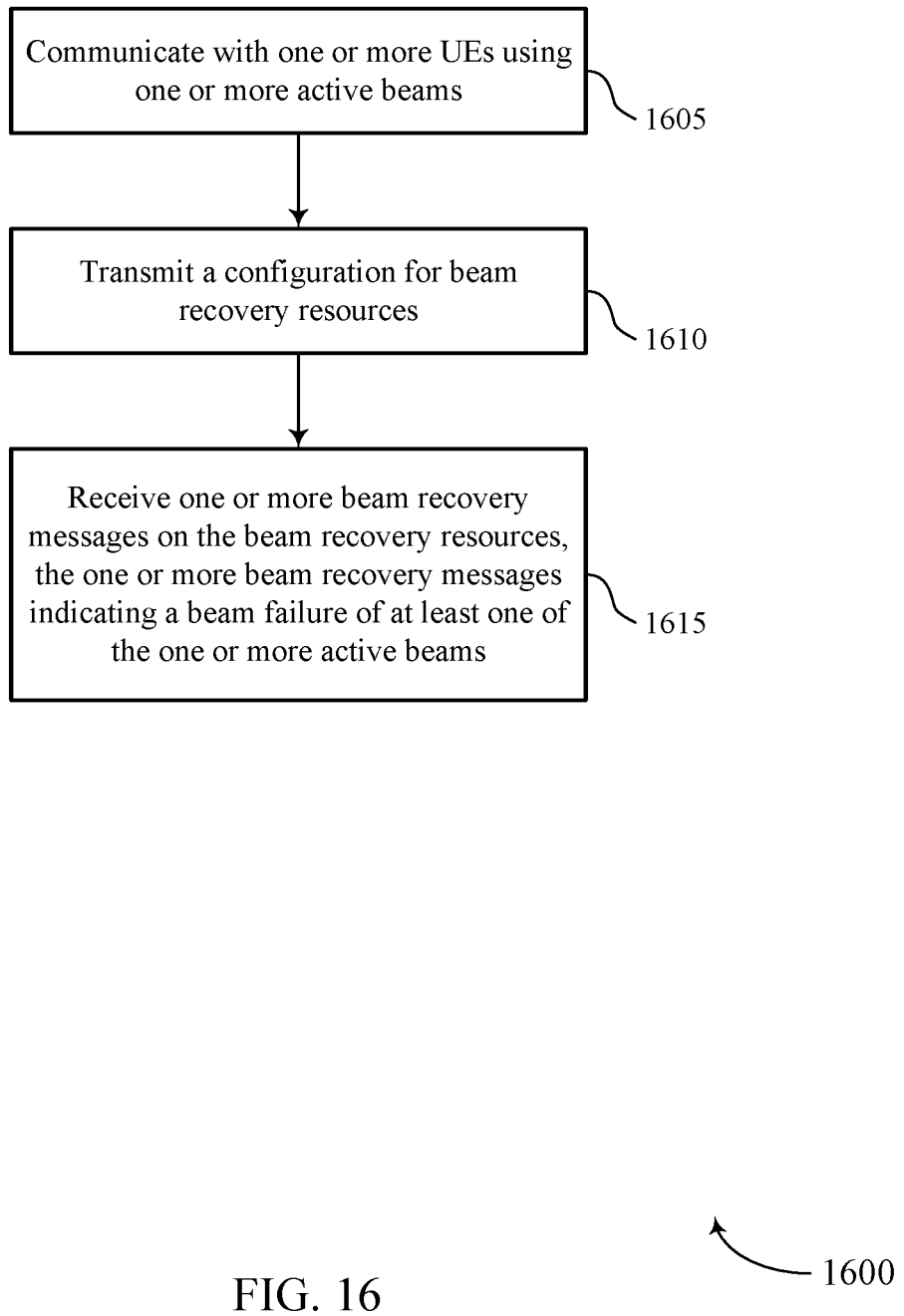

FIG. 16 shows a flowchart illustrating a method 1600 for uplink resources for beam recovery in accordance with various aspects of the present disclosure. The operations of method 1600 may be implemented by a base station 105 or its components as described herein. For example, the operations of method 1600 may be performed by a base station beam recovery manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may communicate with one or more UEs 115 using one or more active beams. The operations of block 1605 may be performed according to the methods described with reference to FIGS. 1 through 4. In certain examples, aspects of the operations of block 1605 may be performed by a communication manager as described with reference to FIGS. 9 through 12.

At block 1610 the base station 105 may transmit a configuration for beam recovery resources. The operations of block 1610 may be performed according to the methods described with reference to FIGS. 1 through 4. In certain examples, aspects of the operations of block 1610 may be performed by a uplink resource manager as described with reference to FIGS. 9 through 12.

At block 1615 the base station 105 may receive one or more beam recovery messages on the beam recovery resources, the one or more beam recovery messages indicating a beam failure of at least one of the one or more active beams. The operations of block 1615 may be performed according to the methods described with reference to FIGS. 1 through 4. In certain examples, aspects of the operations of block 1615 may be performed by a base station beam recovery message manager as described with reference to FIGS. 9 through 12.

Figure 17:
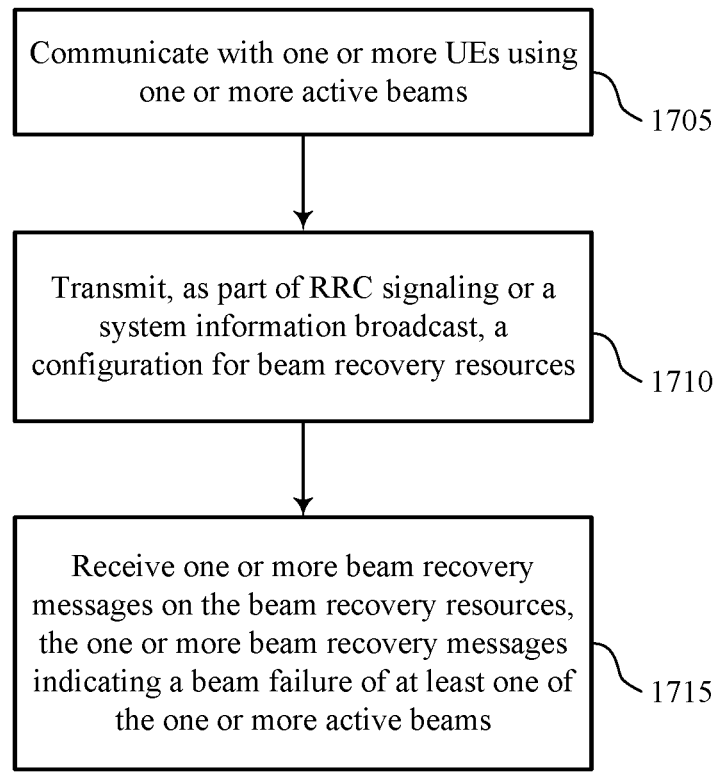

FIG. 17 shows a flowchart illustrating a method 1700 for uplink resources for beam recovery in accordance with various aspects of the present disclosure. The operations of method 1700 may be implemented by a base station 105 or its components as described herein. For example, the operations of method 1700 may be performed by a base station beam recovery manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may communicate with one or more UEs 115 using one or more active beams. The operations of block 1705 may be performed according to the methods described with reference to FIGS. 1 through 4. In certain examples, aspects of the operations of block 1705 may be performed by a communication manager as described with reference to FIGS. 9 through 12.

At block 1710 the base station 105 may transmit, as part of RRC signaling or a system information broadcast, a configuration for beam recovery resources. The operations of block 1710 may be performed according to the methods described with reference to FIGS. 1 through 4. In certain examples, aspects of the operations of block 1710 may be performed by a uplink resource manager as described with reference to FIGS. 9 through 12.

At block 1715 the base station 105 may receive one or more beam recovery messages on the beam recovery resources, the one or more beam recovery messages indicating a beam failure of at least one of the one or more active beams. The operations of block 1715 may be performed according to the methods described with reference to FIGS. 1 through 4. In certain examples, aspects of the operations of block 1715 may be performed by a base station beam recovery message manager as described with reference to FIGS. 9 through 12.

Figure 18:
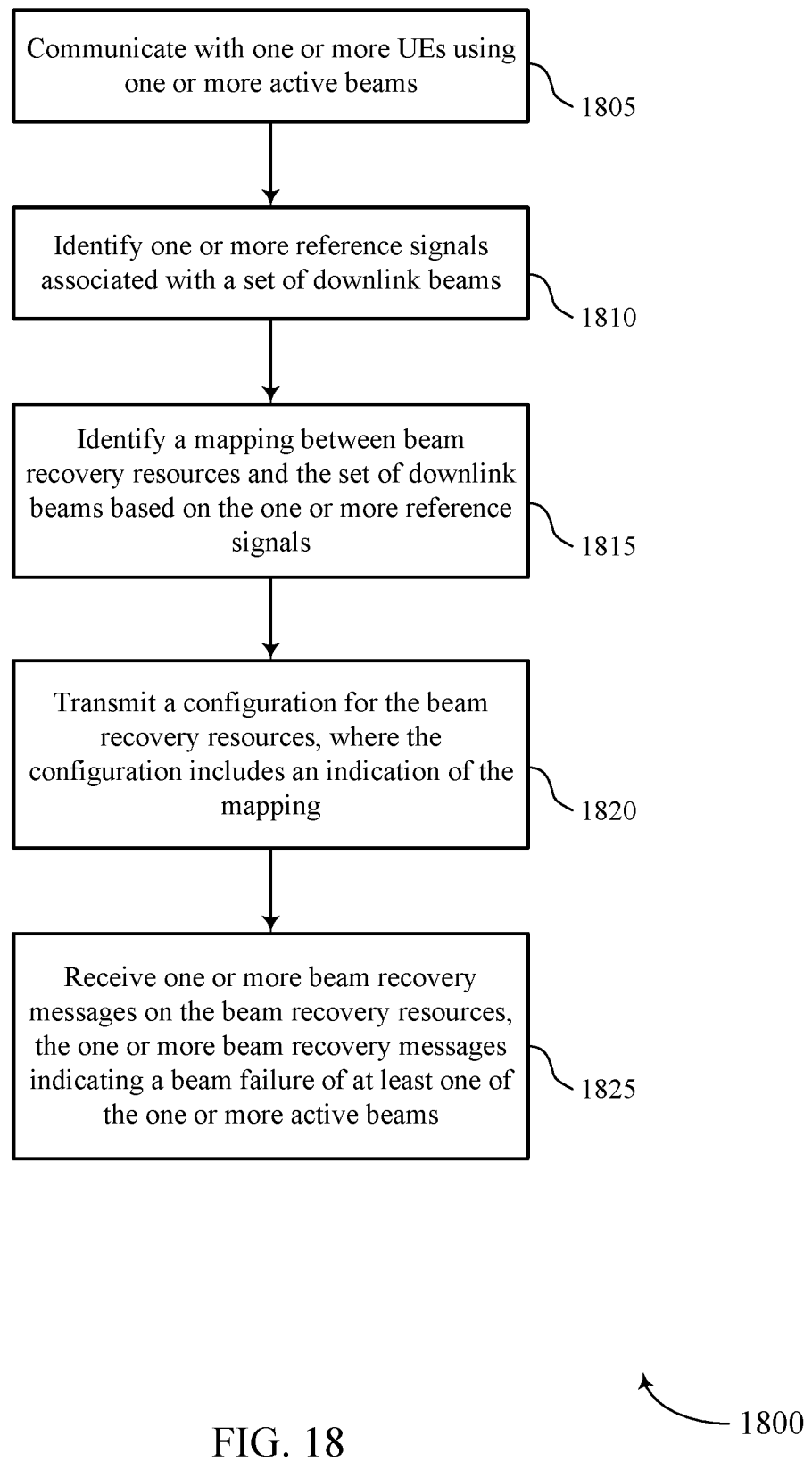

FIG. 18 shows a flowchart illustrating a method 1800 for uplink resources for beam recovery in accordance with various aspects of the present disclosure. The operations of method 1800 may be implemented by a base station 105 or its components as described herein. For example, the operations of method 1800 may be performed by a base station beam recovery manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may communicate with one or more UEs 115 using one or more active beams. The operations of block 1805 may be performed according to the methods described with reference to FIGS. 1 through 4. In certain examples, aspects of the operations of block 1805 may be performed by a communication manager as described with reference to FIGS. 9 through 12.

At block 1810 the base station 105 may identify one or more reference signals associated with a set of downlink beams. The operations of block 1810 may be performed according to the methods described with reference to FIGS. 1 through 4. In certain examples, aspects of the operations of block 1810 may be performed by a reference signal manager as described with reference to FIGS. 9 through 12.

At block 1815 the base station 105 may identify a mapping between beam recovery resources and the set of downlink beams based on the one or more reference signals. The operations of block 1815 may be performed according to the methods described with reference to FIGS. 1 through 4. In certain examples, aspects of the operations of block 1815 may be performed by a uplink resource manager as described with reference to FIGS. 9 through 12.

At block 1820 the base station 105 may transmit a configuration for beam recovery resources, where the configuration includes an indication of the mapping. The operations of block 1820 may be performed according to the methods described with reference to FIGS. 1 through 4. In certain examples, aspects of the operations of block 1820 may be performed by a uplink resource manager as described with reference to FIGS. 9 through 12.

At block 1825 the base station 105 may receive one or more beam recovery messages on the beam recovery resources, the one or more beam recovery messages indicating a beam failure of at least one of the one or more active beams. The operations of block 1825 may be performed according to the methods described with reference to FIGS. 1 through 4. In certain examples, aspects of the operations of block 1825 may be performed by a base station beam recovery message manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple subcarriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a configuration of dedicated beam recovery resources for use in a beam recovery procedure;
   determining, by the UE, whether use of the dedicated beam recovery resources for transmission of a beam recovery message is enabled;
   identifying a beam failure condition for one or more active beams used to communicate with the base station; and
   transmitting, in response to the identified beam failure condition, the beam recovery message to the base station using the dedicated beam recovery resources or using a second set of beam recovery resources based at least in part on a result of the determination.

2. The method of claim 1, further comprising:
   receiving, from the base station, a second configuration of the second set of beam recovery resources as part of a system information broadcast.

3. The method of claim 1,
   wherein the configuration of the dedicated beam recovery resources is received via radio resource control (RRC) signaling.

4. The method of claim 1, further comprising:
   monitoring, by the UE, a physical downlink control channel (PDCCH) for a response to the beam recovery message; and
   receiving, from the base station, the response to the beam recovery message on the PDCCH based at least in part on the monitoring.

5. The method of claim 4, wherein the response to the beam recovery message indicates a presence of one or more additional reference signals for beam refinement.

6. The method of claim 1, further comprising:
   receiving, via the configuration of the dedicated beam recovery resources, an indication of a mapping between a downlink beam from the base station and the dedicated beam recovery resources.

7. The method of claim 1, further comprising:
   determining an identity of a downlink beam from the base station, wherein the beam recovery message comprises an indication of the indication of the identity of the downlink beam.

8. The method of claim 1, further comprising:
   receiving, via the configuration of the dedicated beam recovery resources, an indication of a periodicity for transmitting the beam recovery message to the base station.

9. The method of claim 1, further comprising:
   transmitting, to the base station, a cell radio network temporary identifier (CRNTI) that indicates an identity of the UE.

10. The method of claim 1, wherein each active beam of the one or more active beams is associated with a respective configuration of the dedicated beam recovery resources.

11. The method of claim 1, wherein identifying the beam failure condition for the one or more active beams comprises:
   receiving, from the base station, signaling that indicates use of the dedicated beam recovery resources.

12. The method of claim 1, further comprising:
   receiving, from the base station, an indication of a number of beam recovery requests to be performed by the UE, wherein transmitting the beam recovery message is based at least in part on the number of beam recovery requests.

13. The method of claim 1, further comprising:
   transmitting, using the beam recovery message, an indication of a candidate beam for beam recovery; and
   receiving, from the base station, a confirmation of the candidate beam in response to the beam recovery message.

14. The method of claim 1, further comprising:
   receiving, from the base station, a second configuration of a set of reference signals for beam failure detection; and
   monitoring the set of reference signals based at least in part on the second configuration of the set of reference signals, wherein the beam failure condition is identified based at least in part on the monitoring.

15. The method of claim 14, wherein the set of reference signals comprises one or more channel state information reference signals (CSI-RSs).

16. The method of claim 14, further comprising:
   determining a relationship between the set of reference signals and a set of active beams based at least in part on the second configuration of the set of reference signals, wherein the set of reference signals comprises one or more channel state information reference signals (CSI-RSs).

17. The method of claim 1, wherein the dedicated beam recovery resources comprises contention-free resources.

18. A method for wireless communication at a base station, comprising:
   communicating with one or more user equipment (UEs) using one or more active beams;
   transmitting a configuration of dedicated beam recovery resources for use in a beam recovery procedure; and
   receiving, from the one or more UEs, a beam recovery message on the dedicated beam recovery resources or on a second set of beam recovery resources, the beam recovery message indicating a beam failure condition for at least one of the one or more active beams.

19. The method of claim 18, further comprising:
   transmitting, to the one or more UEs, a second configuration of the second set of beam recovery resources as part of a system information broadcast.

20. The method of claim 18,
   wherein the configuration of the dedicated beam recovery resources is transmitted via radio resource control (RRC) signaling.

21. The method of claim 18, further comprising:
   transmitting, to the one or more UEs, a response to the beam recovery message on a physical downlink control channel (PDCCH), the response to the beam recovery message based at least in part on the received beam recovery message.

22. The method of claim 21, wherein the response to the beam recovery message indicates a presence of one or more additional reference signals for beam refinement.

23. The method of claim 18, further comprising:
transmitting, via the configuration of the dedicated beam recovery resources, an indication of a mapping between a downlink beam of the base station and the dedicated beam recovery resources.

24. The method of claim 18, further comprising:
receiving, via the beam recovery message, an indication of an identity of a downlink beam of the base station.

25. The method of claim 18, further comprising:
transmitting, via the configuration of the dedicated beam recovery resources, an indication of a periodicity for transmitting the beam recovery message.

26. The method of claim 18, further comprising:
receiving a cell radio network temporary identifier (C-RNTI) that indicates an identity of a UE of the one or more UEs.

27. The method of claim 18, wherein each active beam of the one or more active beams is associated with a respective configuration of the dedicated beam recovery resources.

28. The method of claim 18, further comprising:
transmitting, to the one or more UEs, signaling that indicates use of the dedicated beam recovery resources, wherein the dedicated beam recovery resources comprises contention-free resources.

29. The method of claim 18, further comprising:
transmitting, to the one or more UEs, an indication of a number of beam recovery requests to be performed by each UE of the one or more UEs.

30. The method of claim 18, further comprising:
receiving, via the beam recovery message, an indication of a candidate beam for beam recovery; and
transmitting a confirmation of the candidate beam.

31. The method of claim 18, further comprising:
determining a second configuration of a set of reference signals for beam failure detection; and
transmitting, to the one or more UEs, the second configuration of the set of reference signals, wherein the beam recovery message is received based at least in part on the second configuration of the set of reference signals, wherein the set of reference signals comprises one or more channel state information reference signals (CSI-RSs).

32. An apparatus for wireless communication at a user equipment (UE), comprising:
a processor,
memory coupled with the processor; and
instructions stored in the memory and executable by the processor to cause the apparatus to:
receive, from a base station, a configuration of dedicated beam recovery resources for use in a beam recovery procedure;
determine, by the UE, whether use of the dedicated beam recovery resources for transmission of a beam recovery message is enabled; identify a beam failure condition for one or more active beams used to communicate with the base station; and
transmit, in response to the identified beam failure condition, the beam recovery message to the base station using the dedicated beam recovery resources or using a second set of beam recovery resources based at least in part on a result of the determination.

33. The apparatus of claim 32, wherein the instructions are further executable by the processor to cause the apparatus to:
receive, from the base station, a second configuration of the second set of beam recovery resources as part of a system information broadcast.

34. The apparatus of claim 32, wherein
the configuration of the dedicated beam recovery resources is received via radio resource control (RRC) signaling, wherein each active beam of the one or more active beams is associated with a respective configuration of dedicated beam recovery resources.

35. The apparatus of claim 32, wherein the instructions are further executable by the processor to cause the apparatus to:
monitor, by the UE, a physical downlink control channel (PDCCH) for a response to the beam recovery message; and
receive, from the base station, the response to the beam recovery message on the PDCCH based at least in part on the monitoring, wherein the response to the beam recovery message indicates a presence of one or more additional reference signals for beam refinement.

36. The apparatus of claim 32, wherein the instructions are further executable by the processor to cause the apparatus to:
receive, via the configuration of the dedicated beam recovery resources, at least one of a first indication of a mapping between a downlink beam from the base station and the dedicated beam recovery resources, a second indication of a periodicity for transmitting the beam recovery message to the base station, or a third indication of a number of beam recovery requests to be performed by the UE.

37. An apparatus for wireless communication at a base station, comprising:
a processor,
memory coupled with the processor; and
instructions stored in the memory and executable by the processor to cause the apparatus to:
communicate with one or more user equipment (UEs) using one or more active beams;
transmit a configuration of dedicated beam recovery resources for use in a beam recovery procedure; and
receive, from the one or more UEs, a beam recovery message on the dedicated beam recovery resources or on a second set of beam recovery resources, the beam recovery message indicating a beam failure condition for at least one of the one or more active beams.

38. The apparatus of claim 37, wherein the instructions are further executable by the processor to cause the apparatus to:
transmit, to the one or more UEs, a second configuration of the second set of beam recovery resources as part of a system information broadcast.

39. The apparatus of claim 37, wherein
the configuration of the dedicated beam recovery resources is transmitted via radio resource control (RRC) signaling.

40. The apparatus of claim 37, wherein the instructions are further executable by the processor to cause the apparatus to:
transmit, to the one or more UEs, a response to the beam recovery message on a physical downlink control channel (PDCCH), the response to the beam recovery message based at least in part on the received beam recovery message.

41. The apparatus of claim 37, wherein the instructions are further executable by the processor to cause the apparatus to:
transmit, to the one or more UEs, a first indication of a mapping between a downlink beam of the base station and the dedicated beam recovery resources, a second indication of a number of beam recovery requests to be performed by each UE of the one or more UEs, or a third indication of a periodicity for transmitting the beam recovery message, or a combination thereof.

* * * * *